US012620142B2

(12) United States Patent
Sasaki et al.

(10) Patent No.: US 12,620,142 B2
(45) Date of Patent: May 5, 2026

(54) REMOTE OPERATION SYSTEM AND REMOTE OPERATION COMPOSITE SYSTEM

(71) Applicant: KOBELCO CONSTRUCTION MACHINERY CO., LTD., Hiroshima (JP)

(72) Inventors: Hitoshi Sasaki, Tokyo (JP); Seiji Saiki, Tokyo (JP); Yoichiro Yamazaki, Tokyo (JP)

(73) Assignee: Kobelco Construction Machine Co., Ltd., Hiroshima (JP)

( * ) Notice: Subject to any disclaimer, the term of this patent is extended or adjusted under 35 U.S.C. 154(b) by 142 days.

(21) Appl. No.: 18/294,208

(22) PCT Filed: Mar. 30, 2022

(86) PCT No.: PCT/JP2022/015904
§ 371 (c)(1),
(2) Date: Feb. 1, 2024

(87) PCT Pub. No.: WO2023/026568
PCT Pub. Date: Mar. 2, 2023

(65) Prior Publication Data

US 2024/0355007 A1 Oct. 24, 2024

(30) Foreign Application Priority Data

Aug. 27, 2021 (JP) ................................ 2021-139429
Aug. 27, 2021 (JP) ................................ 2021-139430

(51) Int. Cl.
*G06T 11/00* (2026.01)
*E02F 9/20* (2006.01)
(Continued)

(52) U.S. Cl.
CPC .............. *G06T 11/00* (2013.01); *E02F 9/205* (2013.01); *G06T 7/70* (2017.01); *H04N 7/181* (2013.01); *G06T 2207/30252* (2013.01)

(58) Field of Classification Search
CPC ................................. E02F 9/205; E02F 3/435
(Continued)

(56) References Cited

U.S. PATENT DOCUMENTS 6,928,384 B2 * 8/2005 Kochi ................. H04N 13/194 702/155
2009/0202109 A1 * 8/2009 Clar ....................... E02F 9/261 382/104
(Continued)

FOREIGN PATENT DOCUMENTS

JP 5473870 B2 4/2014
JP 2018-115077 A 7/2018
(Continued)

*Primary Examiner* — Samantha (Yuehan) Wang
(74) *Attorney, Agent, or Firm* — Carrier, Shende & Associates P.C.; Joseph P. Carrier; Jeffrey T. Gedeon

(57) ABSTRACT

A remote operation system has respective mutual communication functions of communicating with a work machine (40) and a remote operation apparatus (20) and includes a support processing element (101) configured to transmit, to the remote operation apparatus (20), a combined image in which an index image is superimposed at least partially on the work machine (40) or a region around the work machine (40) in a captured image obtained through an imaging device disposed around the work machine. The index image is generated based on a mode of appearance of the lower traveling body (430) in the captured image and a mode of appearance of a designated component in the captured image. The designated component is unevenly disposed in a front or back direction of the lower traveling body (430).
(Continued)

The index image indicates at least one of the front and back directions of the lower traveling body (430).

11 Claims, 23 Drawing Sheets

(51) Int. Cl.
*G06T 7/70* (2017.01)
*H04N 7/18* (2006.01)

(58) Field of Classification Search
USPC .......................................................... 345/633
See application file for complete search history.

(56) References Cited

U.S. PATENT DOCUMENTS

| | | | | |
|---|---|---|---|---|
| 2014/0267731 | A1* | 9/2014 | Izumikawa | B60R 1/23<br>348/148 |
| 2017/0175364 | A1* | 6/2017 | Hasegawa | G06T 11/40 |
| 2018/0044893 | A1* | 2/2018 | Machida | H04N 23/90 |
| 2018/0143011 | A1* | 5/2018 | Rudy | G06T 7/70 |
| 2021/0054597 | A1 | 2/2021 | Ueda et al. | |
| 2021/0062473 | A1* | 3/2021 | Ding | G09G 5/377 |

FOREIGN PATENT DOCUMENTS

| | | | |
|---|---|---|---|
| JP | 2020-112030 | A | 7/2020 |
| WO | 2019/187560 | A1 | 10/2019 |

* cited by examiner

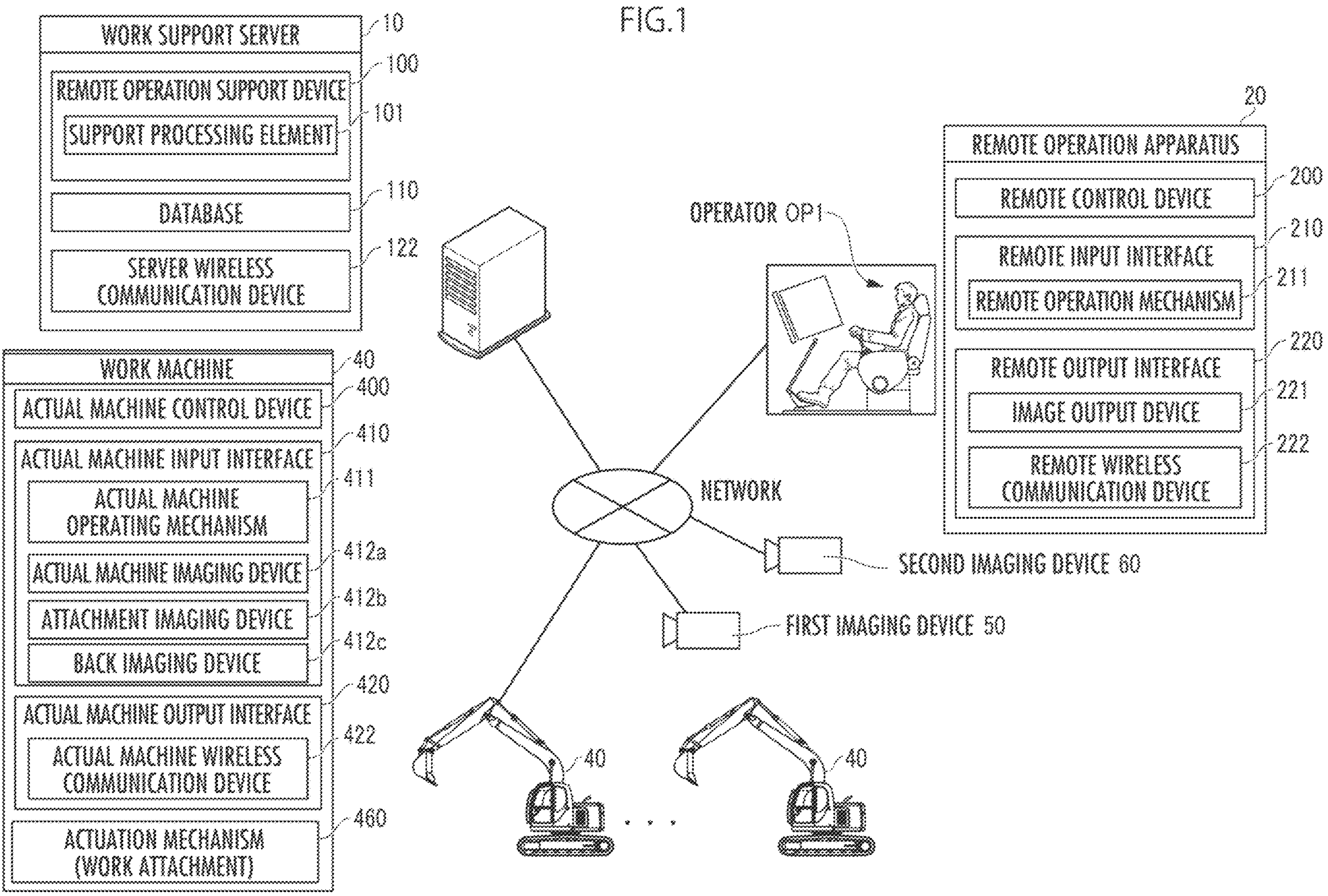
FIG.1
WORK SUPPORT SERVER
10
REMOTE OPERATION SUPPORT DEVICE
100
SUPPORT PROCESSING ELEMENT
101
DATABASE
110
SERVER WIRELESS COMMUNICATION DEVICE
122
WORK MACHINE
40
ACTUAL MACHINE CONTROL DEVICE
400
ACTUAL MACHINE INPUT INTERFACE
410
ACTUAL MACHINE OPERATING MECHANISM
411
ACTUAL MACHINE IMAGING DEVICE
412a
ATTACHMENT IMAGING DEVICE
412b
BACK IMAGING DEVICE
412c
ACTUAL MACHINE OUTPUT INTERFACE
420
ACTUAL MACHINE WIRELESS COMMUNICATION DEVICE
422
ACTUATION MECHANISM (WORK ATTACHMENT)
460
OPERATOR OP1
NETWORK
SECOND IMAGING DEVICE 60
FIRST IMAGING DEVICE 50
40
40
REMOTE OPERATION APPARATUS
20
REMOTE CONTROL DEVICE
200
REMOTE INPUT INTERFACE
210
REMOTE OPERATION MECHANISM
211
REMOTE OUTPUT INTERFACE
220
IMAGE OUTPUT DEVICE
221
REMOTE WIRELESS COMMUNICATION DEVICE
222

2212
40
I1
2210
465
2211
I2
40
I2
2213
460
I3

2212
40
11
2210
465
460
2211
40
12
12
2213

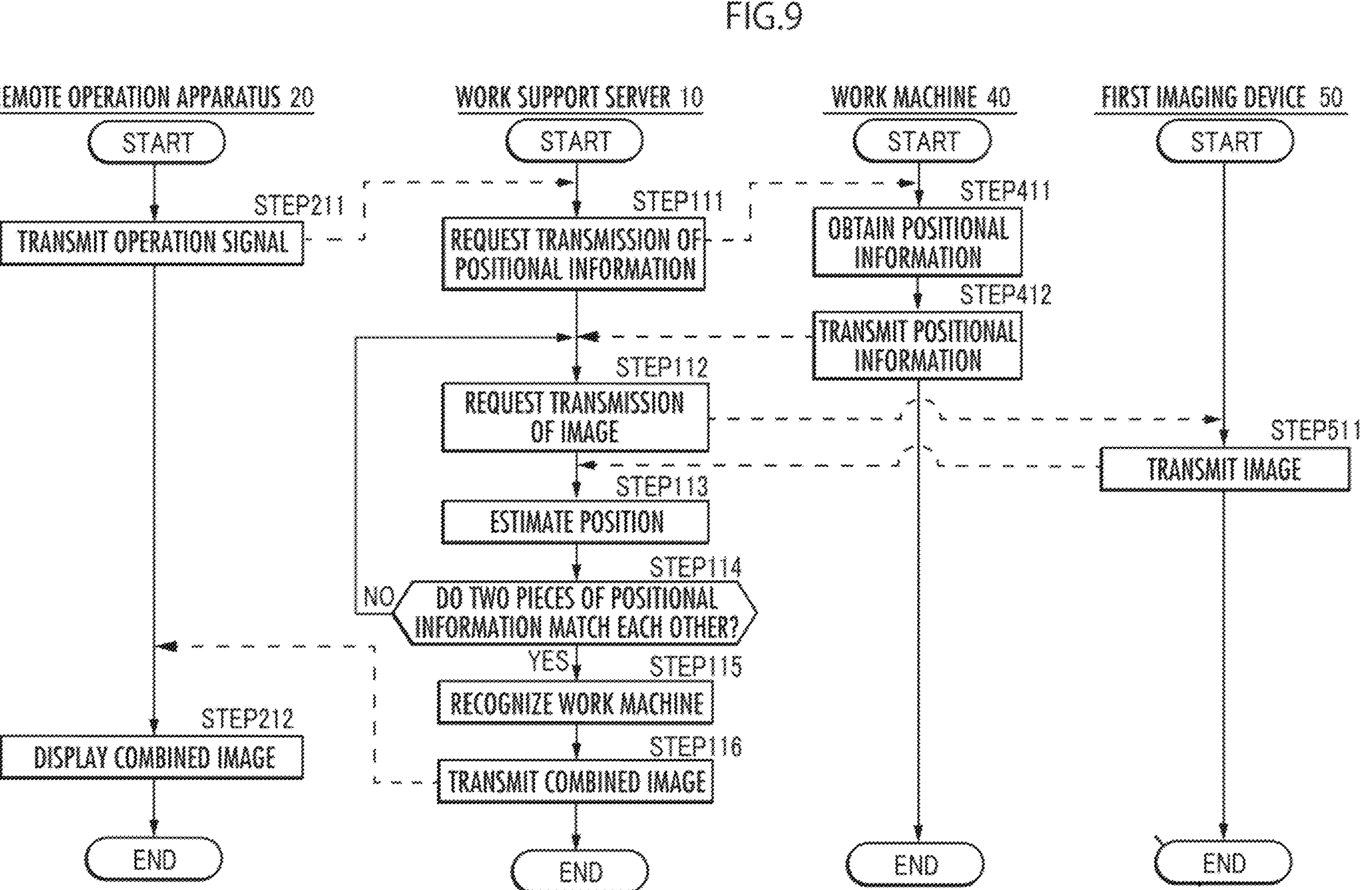
FIG.9
REMOTE OPERATION APPARATUS 20
WORK SUPPORT SERVER 10
WORK MACHINE 40
FIRST IMAGING DEVICE 50
START
STEP211
TRANSMIT OPERATION SIGNAL
STEP111
REQUEST TRANSMISSION OF POSITIONAL INFORMATION
STEP411
OBTAIN POSITIONAL INFORMATION
STEP412
TRANSMIT POSITIONAL INFORMATION
STEP112
REQUEST TRANSMISSION OF IMAGE
STEP511
TRANSMIT IMAGE
STEP113
ESTIMATE POSITION
STEP114
DO TWO PIECES OF POSITIONAL INFORMATION MATCH EACH OTHER?
NO
YES
STEP115
RECOGNIZE WORK MACHINE
STEP116
TRANSMIT COMBINED IMAGE
STEP212
DISPLAY COMBINED IMAGE
END

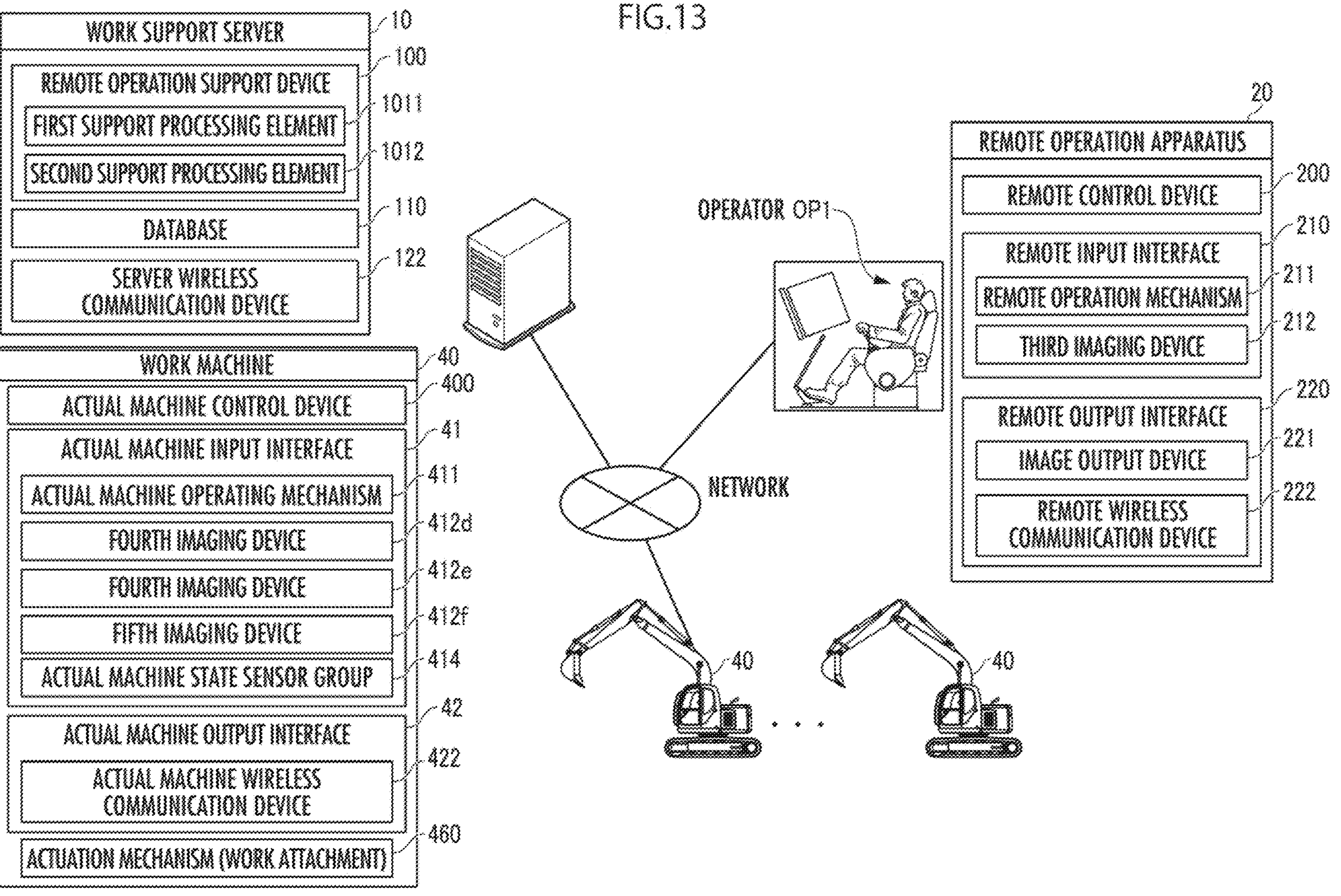
FIG.13
WORK SUPPORT SERVER
10
REMOTE OPERATION SUPPORT DEVICE
100
FIRST SUPPORT PROCESSING ELEMENT
1011
SECOND SUPPORT PROCESSING ELEMENT
1012
DATABASE
110
SERVER WIRELESS COMMUNICATION DEVICE
122
WORK MACHINE
40
ACTUAL MACHINE CONTROL DEVICE
400
ACTUAL MACHINE INPUT INTERFACE
41
ACTUAL MACHINE OPERATING MECHANISM
411
FOURTH IMAGING DEVICE
412d
FOURTH IMAGING DEVICE
412e
FIFTH IMAGING DEVICE
412f
ACTUAL MACHINE STATE SENSOR GROUP
414
ACTUAL MACHINE OUTPUT INTERFACE
42
ACTUAL MACHINE WIRELESS COMMUNICATION DEVICE
422
ACTUATION MECHANISM (WORK ATTACHMENT)
460
OPERATOR OP1
NETWORK
40
40
20
REMOTE OPERATION APPARATUS
REMOTE CONTROL DEVICE
200
REMOTE INPUT INTERFACE
210
REMOTE OPERATION MECHANISM
211
THIRD IMAGING DEVICE
212
REMOTE OUTPUT INTERFACE
220
IMAGE OUTPUT DEVICE
221
REMOTE WIRELESS COMMUNICATION DEVICE
222

FIG.18 A
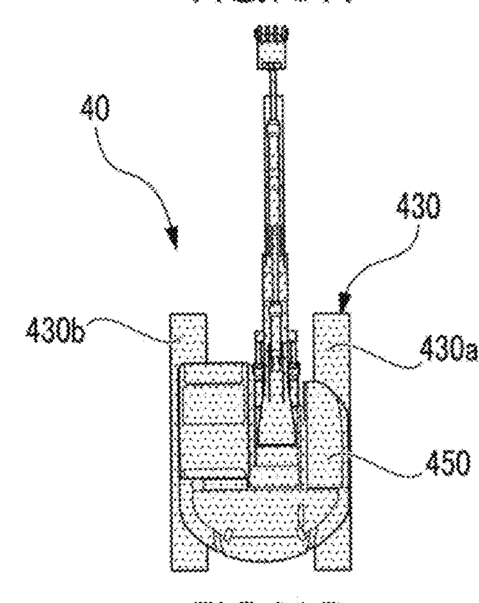
FIG.18 B
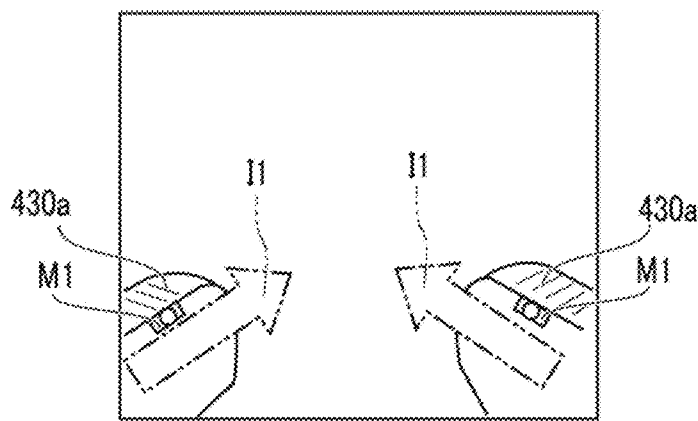
FIG.18 C
I2
460

FIG.21A
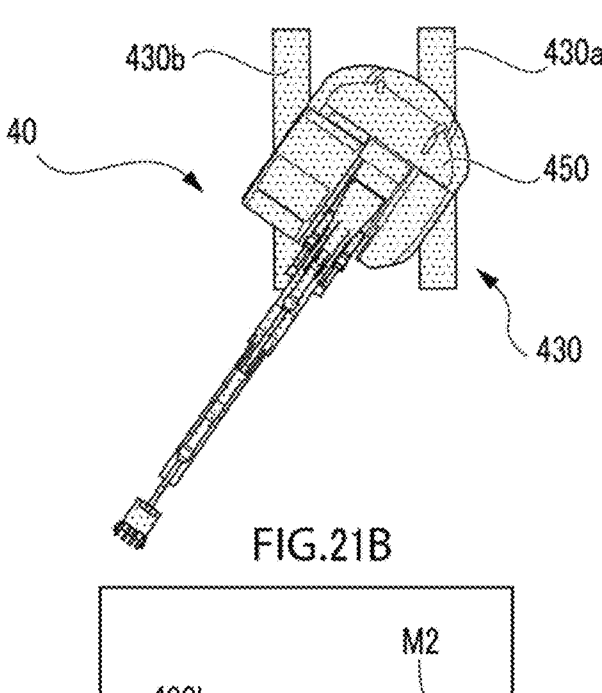
FIG.21B
430b
M2
I1
FIG.21C
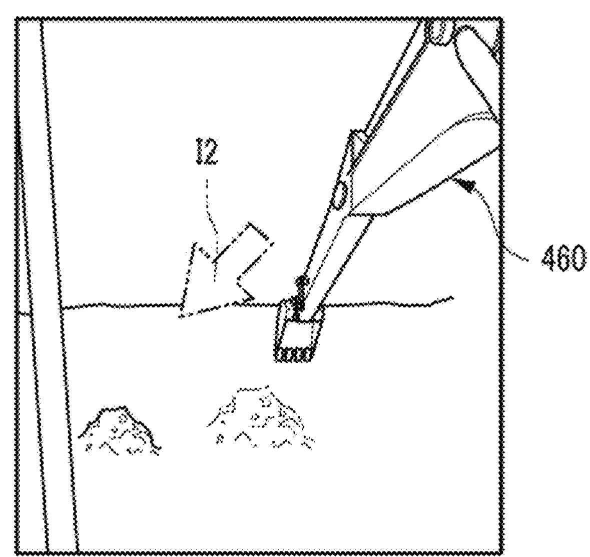

FIG. 22 A
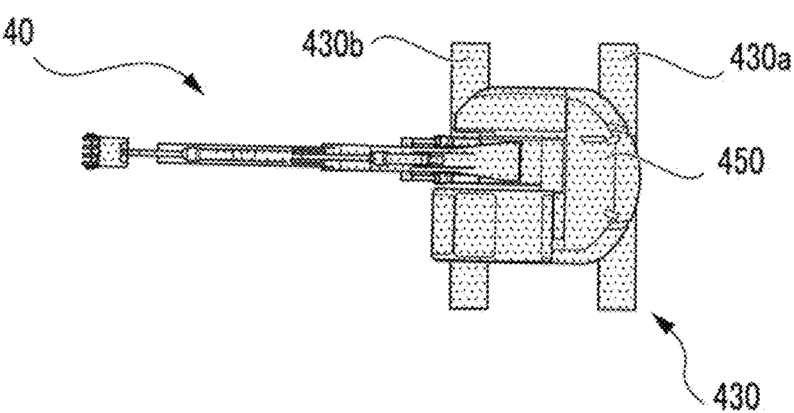
FIG. 22 B
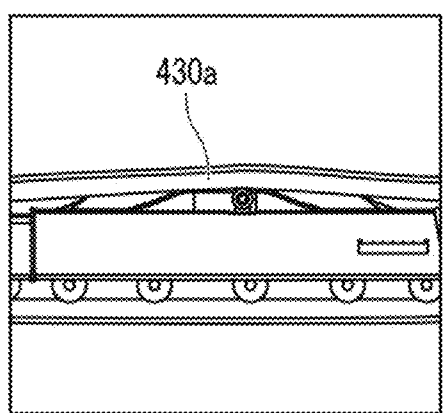
FIG. 22 C
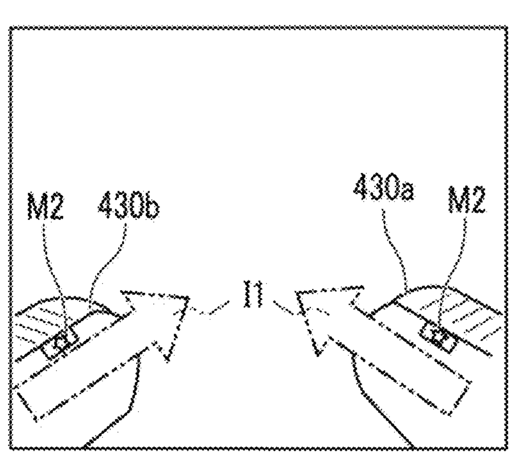
FIG. 22 D
I2
460

REMOTE OPERATION SYSTEM AND REMOTE OPERATION COMPOSITE SYSTEM

TECHNICAL FIELD

The present invention relates to a remote operation system having respective mutual communication functions of communicating with a work machine and a remote operation apparatus for remotely operating the work machine.

BACKGROUND ART

It has been practiced to provide a plurality of cameras that each takes an image of an area around a work machine or a plurality of cameras that is capable of imaging the work machine at angles different from each other, so as to generate a bird's-eye image of the work machine by using a plurality of captured images taken by the plurality of cameras.

As an example of such a work machine, Patent Literature 1 discloses a hydraulic excavator comprising, for example, a plurality of cameras that each image an area around the hydraulic excavator and a bird's-eye image generator that generates a bird's-eye image based on images taken by the plurality of cameras.

In addition, the work machine such as a hydraulic excavator comprises, for example, a lower traveling body and an upper revolving body that is revolvable with respect to this lower traveling body. The upper revolving body is also provided with a cab included in an operator's room.

A revolution of the upper revolving body with respect to the lower traveling body in such a work machine may cause a front direction of the cab, and a forward direction or a backward direction of the work machine to be different from each other. This raises a problem in that it is difficult for an operator to learn in which direction the work machine advances when performing a traveling operation.

Accordingly, an advancing direction of the work machine has been indicated with an arrow on a monitor provided inside the cab. For example. Patent Literature 2 discloses a monitor device for a construction machine in which an upper revolving body is revolvable with respect to a lower traveling body. The construction machine comprises a camera that takes an image of an area around the machine. The monitor device displays the image taken by the camera on a monitor screen disposed inside a cab.

CITATION LIST

Patent Literature

Patent Literature 1: Japanese Patent Laid-Open No. 2020-112030

Patent Literature 2: Japanese Patent No. 5473870

SUMMARY OF INVENTION

Technical Problem

It is, however, difficult for an operator to recognize the front or back direction of the lower traveling body by simply watching the bird's-eye image. This raises a problem in that the operator has to move forward or backward the lower traveling body to recognize the front or back direction of the lower traveling body.

In addition, the monitor device in Patent Literature 2 estimates the angle of the lower traveling body relative to the upper revolving body by using a temporal change in the image displayed on the monitor screen. This requires complicated image processing for estimating the relative angle and raises a problem of a heavier processing load.

An object of the present invention, which has been made in view of such problems, is to provide a remote operation system and a remote operation composite system including the remote operation system. The remote operation system makes it possible to reduce a processing load and indicate a forward direction or a backward direction of a work machine in a simple configuration.

Solution to Problem

A remote operation system according to the present invention for achieving the object is a remote operation system having respective mutual communication functions of communicating with a work machine and a remote operation apparatus. The work machine includes a lower traveling body and an upper revolving body. The upper revolving body is revolvable with respect to the lower traveling body. The remote operation apparatus is for remotely operating the work machine. The remote operation system includes a support processing element configured to transmit, to the remote operation apparatus, a combined image in which an index image is superimposed at least partially on the work machine or a region around the work machine in a captured image obtained through an imaging device disposed around the work machine. The index image is generated based on a mode of appearance of the lower traveling body in the captured image and a mode of appearance of a designated component in the captured image. The designated component is unevenly disposed in a front or back direction of the lower traveling body. The index image indicates at least one of the front and back directions of the lower traveling body.

In addition, a remote operation composite system according to the present invention includes: the remote operation system; and at least one of the remote operation apparatus and the work machine.

According to the remote operation system and the remote operation composite system according to the present invention, a combined image is generated in which an index image indicating a front or back direction of a lower traveling body of a work machine is superimposed on a captured image, and transmission of the combined image to the remote operation apparatus allows an operator to easily grasp the front or back direction of the lower traveling body of the work machine by visually observing the combined image.

BRIEF DESCRIPTION OF DRAWINGS

FIG. 1 is an explanatory diagram of a configuration of a work support system serving as an embodiment of the present invention.

FIG. 9 is a flowchart illustrating other work support processing of the work support system.

FIG. 13 is an explanatory diagram of a configuration of a work support system serving as an embodiment of the present invention.

FIG. 18A, FIG. 18B, and FIG. 18C are explanatory diagrams illustrating an example of an image taken by an imaging device.

FIG. 21A, FIG. 21B, and FIG. 21C are explanatory diagrams illustrating an example of the image taken by the imaging device.

FIG. 22A, FIG. 22B, FIG. 22C, and FIG. 22D are explanatory diagrams illustrating an example of the image taken by the imaging device.

DESCRIPTION OF EMBODIMENTS

Embodiments

Figure 2:
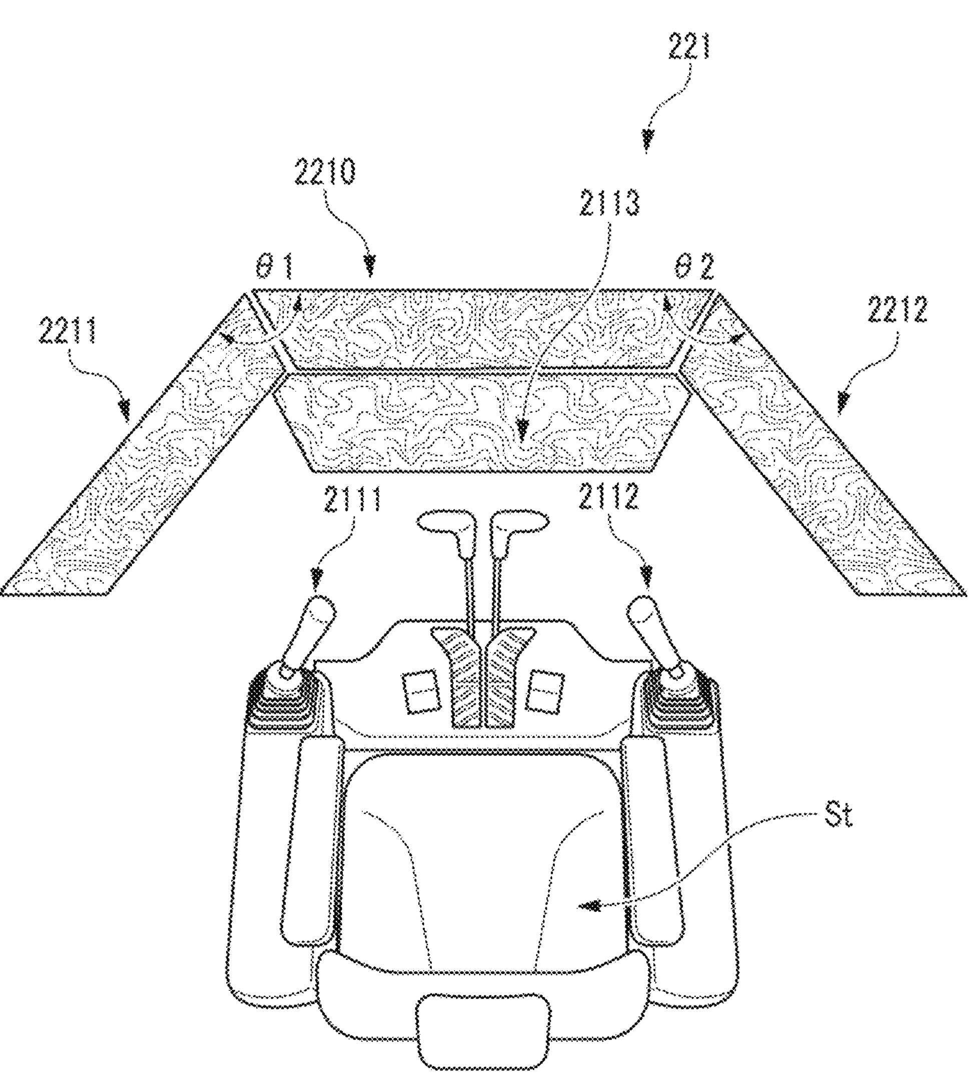
FIG. 2 is an explanatory diagram for a configuration of a remote operation apparatus in FIG. 1.

First Embodiment (Configuration of Remote Operation System)

A work support system serving as an embodiment of the present invention illustrated in FIG. 1 includes a work support server 10 for supporting remote operations on a plurality of work machines 40 by a remote operation apparatus 20. The work support server 10, the remote operation apparatus 20, the plurality of work machines 40, a first imaging device 50, and a second imaging device 60 are each configured to be communicable with each other through a common network or different networks. In FIG. 1, the work support server 10 is connectable to the plurality of work machines 40, but it is sufficient if the work support server 10 is connectable to the one or more work machines 40 and the number of connectable work machines 40 is not limited. In addition, in FIG. 1, the first imaging device 50 and the second imaging device 60 are connected to each other through a network to allow for communication, but two or more imaging devices or a single imaging device alone may be connected to this network.

The first embodiment is a remote operation system having respective mutual communication functions of causing the work support server 10 to communicate with the plurality of work machines 40 and the remote operation apparatus 20 for remotely operating one of the plurality of work machines 40 which is a remote operation target.

"Obtaining" various kinds of information by a component (hardware) according to the present invention is a concept that encompasses any calculation processing for preparing the various kinds of information in a form in which the information is usable in subsequent calculation processing such as receiving the information, reading or retrieving the information from an internal storage device (e.g., a memory) and/or an external storage device (e.g., an external database server), or executing calculation processing, for example, on the received, read, or retrieved information to, for example, calculate, estimate, predict, or identify the information.

(Configuration of Work Support Server)

The work support server 10 comprises a remote operation support device 100, a database 110, and a server wireless communication device 122. The remote operation support device 100 includes a support processing element 101.

The support processing element 101 includes a processing unit (a single-core processor or a multi-core processor, or the processor core or the processor cores included therein). The support processing element 101 reads necessary data and software from a storage device such as a memory and executes calculation processing compliant with the software on the data. The calculation processing will be described below.

The database 110 stores and holds the pieces of data or the like of captured images taken by imaging devices such as the first imaging device 50 and the second imaging device 60. The database 110 may include a database server different from the work support server 10.

(Configuration of Remote Operation Apparatus)

The remote operation apparatus 20 comprises a remote control device 200, a remote input interface 210, and a remote output interface 220. The remote control device 200 includes a processing unit (a single-core processor or a multi-core processor, or the processor core or the processor cores included therein). The remote control device 200 reads necessary data and software from a storage device such as a memory and executes calculation processing compliant with the software on the data.

The remote input interface 210 comprises a remote operation mechanism 211.

The remote operation mechanism 211 includes a traveling operation device, a revolving operation device, a boom operation device, an arm operation device, a bucket operation device, and a cutoff lever that switches an acceptance state of an operation by an operator. Each of the operation devices includes an operation lever that receives a rotating operation. An operation lever (travel lever) of the traveling operation device is operated to move a lower traveling body 430 comprising a pair of left and right crawlers of the work machine 40. The travel lever may also serve as a travel pedal. For example, there may be provided a travel pedal fixed at a base or a lower end of the travel lever. The operation lever (revolving lever) of the revolving operation device is operated to move a hydraulic revolution motor included in a revolving mechanism 440 of the work machine 40. The operation lever (boom lever) of the boom operation device is operated to move a boom cylinder 462 of the work machine 40. The operation lever (arm lever) of the arm operation device is operated to move an arm cylinder 464 of the work machine 40. The operation lever (bucket lever) of the bucket operation device is operated to move a bucket cylinder 466 of the work machine 40.

The respective operation levers included in the remote operation mechanism 211 are disposed around a seat St on which an operator OP1 sits down, for example, as illustrated in FIG. 2. The seat St is formed like a high back chair with armrests, but may be a seating section having any form that allows the operator OP1 to sit down thereon such as the form of a low back chair with no headrest or the form of a chair with no backrest.

A pair of left and right travel levers 2110 corresponding to the left and right crawlers are disposed laterally side by side in front of the seat St. One operation lever may serve as a plurality of operation levers. For example, a left operation lever 2111 provided in front of the left frame of the seat St illustrated in FIG. 2 may function as an arm lever when operated in the front or back direction, and may function as a revolving lever when operated in the left or right direction. Similarly, a right operation lever 2112 provided in front of the right fame of the seat St illustrated in FIG. 2 may function as a boom lever when operated in the front or back direction, and may function as a bucket lever when operated in the left or right direction. The lever patterns may be optionally changed in accordance with an operation instruction of the operator OP1.

The unillustrated cutoff lever is provided below the left operation lever 2111 in front of the left frame of the seat St. The cutoff lever functions as an operation lever for locking the respective operation levers 2110, 2111, and 2112 when raised (turned off) to prevent the work machine 40 from moving even when the operation levers 2110, 2111, and 2112 are operated, while unlocking the respective operation levers 2110, 2111, and 2112 when lowered (turned on).

The remote output interface 220 comprises an image output device 221 and a remote wireless communication device 222.

The image output device 221 includes a middle image output device 2210, a left image output device 2211, a right image output device 2212, and a lower image output device 2213, for example, as illustrated in FIG. 2. The middle image output device 2210, the left image output device 2211, and the right image output device 2212 are respectively disposed in front of the seat St, in front of and to the left of the seat St, and in front of and to the right of the seat St. The middle image output device 2210, the left image output device 2211, and the right image output device 2212 each include a screen having a substantially rectangular shape. The lower image output device 2213 is disposed below the middle image output device 2210. The lower image output device 2213 includes a screen having a substantially rectangular shape. The respective screens (image display regions) of the middle image output device 2210, the left image output device 2211, the right image output device 2212, and the lower image output device 2213 may be the same or different in shape and size.

The respective screens of the middle image output device 2210, the left image output device 2211, the right image output device 2212, and the lower image output device 2213 may be parallel with a perpendicular direction or may be inclined with respect to the perpendicular direction. At least one image output device of the middle image output device 2210, the left image output device 2211, the right image output device 2212, and the lower image output device 2213 may include an image output device divided into a plurality of image output devices. For example, the middle image output device 2210 may include a pair of image output devices that each include a screen having a substantially rectangular shape and are vertically adjacent to each other.

(Configuration of Work Machine)

As illustrated in FIG. 1, the work machine 40 comprises an actual machine control device 400, an actual machine input interface 410, an actual machine output interface 420, and an actuation mechanism 460.

The actual machine control device 400 includes a processing unit (a single-core processor or a multi-core processor, or the processor core or the processor cores included therein). The actual machine control device 400 reads necessary data and software from a storage device such as a memory and executes calculation processing compliant with the software on the data.

Figure 3:
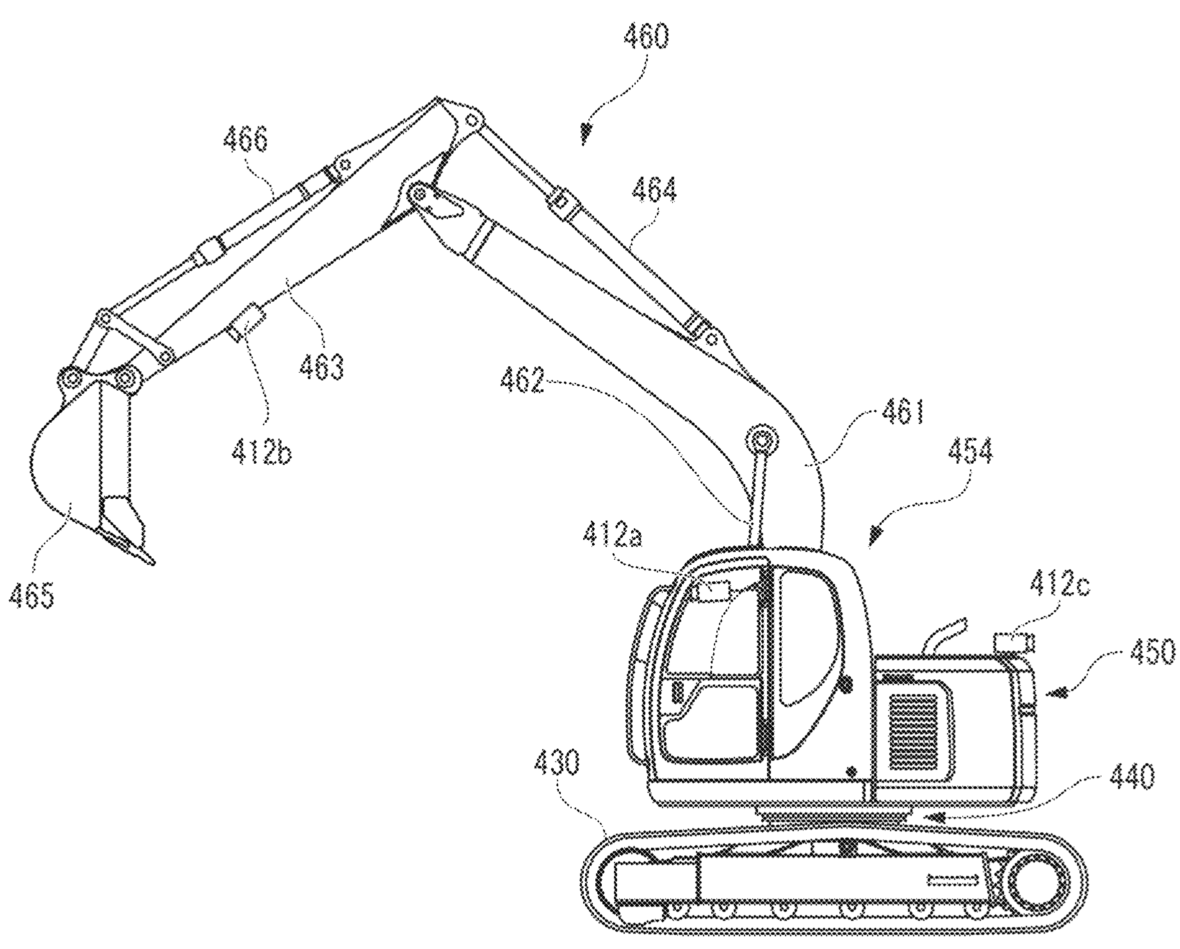
FIG. 3 is an explanatory diagram for a configuration of a work machine in FIG. 1.

The work machine 40 is, for example, a hydraulic, electric, or hybrid drive crawler excavator (construction machine). The hybrid drive is a combination of hydraulic and electric drives. As illustrated in FIG. 3, the work machine 40 comprises the lower traveling body 430 and an upper revolving body 450 that is revolvably mounted on the lower traveling body 430 with the revolving mechanism 440 interposed in between. There is provided a cab 454 (operator's room) at the left front of the upper revolving body 450. The actuation mechanism 460 is provided at the middle front of the upper revolving body 450.

Figure 4:
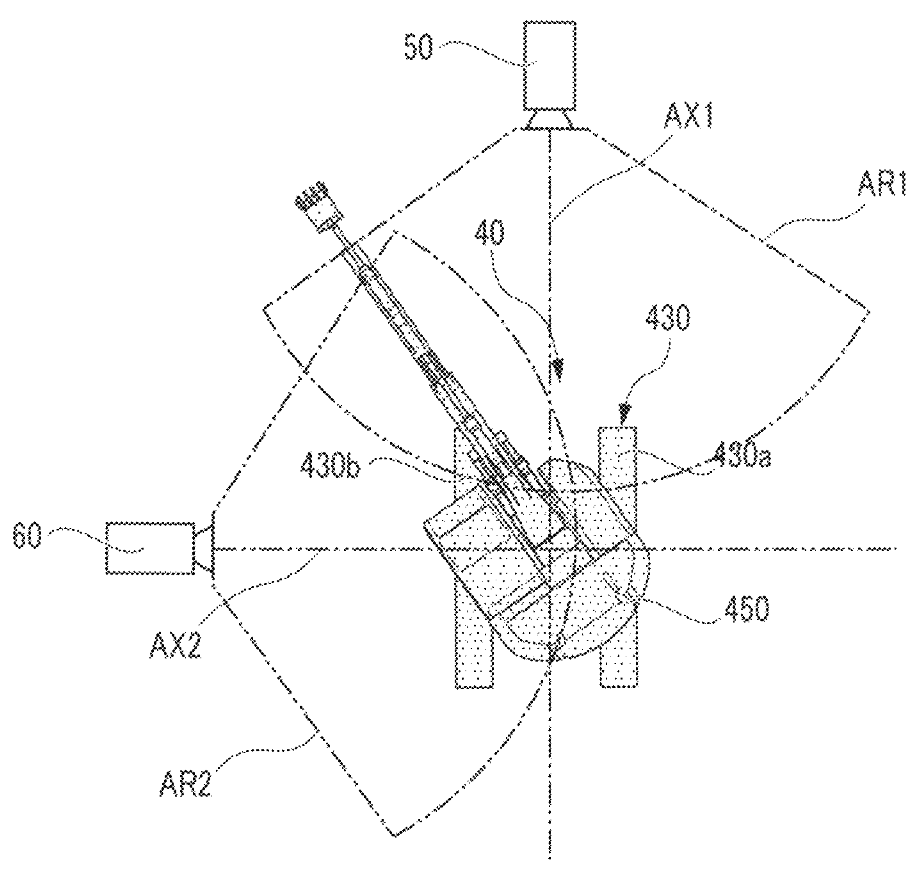
FIG. 4 is an explanatory diagram for an environment around the work machine in FIG. 1.

As illustrated in FIG. 4, the lower traveling body 430 comprises a pair of left and right crawlers 430*a* and 430*b*. In addition, as also illustrated in FIG. 3, the lower traveling body 430 comprises a drive member 431 for driving the right crawler 430*a* and a drive member 431 for driving the left crawler 430*b*. Each of the drive members 431 is one of designated components that are unevenly disposed on the back direction of the lower traveling body 430 among the front and back directions. Examples of the drive member 431 include a drive motor, a gear that is engaged with the drive motor, and the like.

The actual machine input interface 410 comprises an actual machine operating mechanism 411, an actual machine imaging device 412*a*, an attachment imaging device 412*b*, and aback imaging device 412*c*. The actual machine operating mechanism 411 comprises a plurality of operation levers around a seat disposed inside the cab 454. The plurality of operation levers is disposed as with the remote operation mechanism 211.

The cab 454 is provided with a drive mechanism or a robot that receives a signal corresponding to a mode of operating a remote operation lever and moves an actual machine operating lever based on the received signal.

The actual machine imaging device 412*a* (also referred to as a main camera below) is installed, for example, inside the cab 454 and images an environment including at least a portion of the actuation mechanism 460 through a front window and a pair of left and right side windows. The captured image may omit a portion or all of the front window (or the window frame) and the side windows.

The attachment imaging device 412*b* (also referred to as an attachment camera below) is installed, for example, at an arm 463 and images an environment including at least a portion of a bucket 465 that is an attachment.

The back imaging device 412*c* (also referred to as a back camera below) is provided on a hood (not illustrated), a counterweight (not illustrated), or the cab 454 to allow the area behind the cab 454 to be imaged, for example, when a direction in which the front window is provided is treated as the front of the upper revolving body 450 as viewed from the seat in the cab 454.

The actual machine input interface 410 includes an actual machine state sensor group (not illustrated). The actual machine state sensor group (not illustrated) includes respective angle sensors for measuring a rotation angle (angle for moving up and down) of a boom 461 with respect to the upper revolving body 450, a rotation angle of the arm 463 with respect to the boom 461, and a rotation angle of the bucket 465 with respect to the arm 463, a revolution angle sensor for measuring a revolution angle of the upper revolving body 450 with respect to the lower traveling body 430, an external force sensor for measuring external force that acts on the bucket 465, a three-axis acceleration sensor for measuring three-axis acceleration that acts on the upper revolving body 450, a positional information obtaining sensor such as a GNSS (Global Navigation Satellite System), and the like.

The actual machine output interface 420 comprises an actual machine wireless communication device 422.

The actuation mechanism 460 serving as an actuation mechanism comprises the boom 461 that is attached to the upper revolving body 450 to be movable up and down, the arm 463 that is rotatably coupled to a tip of the boom 461, and the bucket 465 that is rotatably coupled to a tip of the arm 463. The actuation mechanism 460 is mounted with the boom cylinder 462, the arm cylinder 464, and the bucket cylinder 466 that each include a telescopic hydraulic cylinder. As work units, various attachments such as a nibbler, a cutter, and a magnet may be used in addition to the bucket 465.

The boom cylinder 462 is interposed between the boom 461 and the upper revolving body 450 to extend and retract by being supplied with hydraulic oil and cause the boom 461 to rotate in the direction in which the boom 461 moves up and down. The arm cylinder 464 is interposed between the arm 463 and the boom 461 to extend and retract by being supplied with hydraulic oil and cause the arm 463 to rotate around a horizontal axis with respect to the boom 461. The bucket cylinder 466 is interposed between the bucket 465 and the arm 463 to extend and retract by being supplied with hydraulic oil and cause the bucket 465 to rotate around the horizontal axis with respect to the arm 463.

As illustrated in FIG. 4, the first imaging device 50 and the second imaging device 60 are attached to support columns provided outside the work machine 40 to include, for example, the external appearance of the work machine 40 in imaging areas AR1 and AR2. The first imaging device 50 and the second imaging device 60 are installed to respectively image the external appearance of the work machine 40 in different optical axis directions AX1 and AX2. It is to be noted that the first imaging device 50 and the second imaging device 60 may be attached to pan heads that allow the optical axis directions AX1 and AX2 to be freely changed, for example, in accordance with commands from the work support server 10. The optical axis directions AX1 and AX2 of the first imaging device 50 and the second imaging device 60 may be changed by using, for example, adjustment mechanisms of optical systems comprised in the first imaging device 50 and the second imaging device 60. For example, it is favorable to adjust the optical axis directions AX1 and AX2 of the first imaging device 50 and the second imaging device 60 toward horizontal planes to allow the crawlers 430*a* and 430*b* to be imaged. In FIG. 4, the first imaging device 50 and the second imaging device 60 are disposed to have the optical axis directions AX1 and AX2 of the first imaging device 50 and the second imaging device 60 orthogonal to each other in a top view. It is, however, possible to dispose the first imaging device 50 and the second imaging device 60 at any positions. It is possible to dispose the first imaging device 50 and the second imaging device 60 in a relationship in which the optical axis directions AX1 and AX2 thereof are not orthogonal to each other in a top view.

For example, as illustrated in FIG. 4, the first imaging device 50 is disposed in the front direction of the lower traveling body 430 of the work machine 40 among the front and back directions and the second imaging device 60 is disposed on the left direction (left crawler 430*b* side) of the lower traveling body 430 of the work machine 40 among the left and right directions. The first imaging device 50 and the second imaging device 60 are disposed in this way, allowing at least one of the first imaging device 50 and the second imaging device 60 to include a side surface of any of the pair of crawlers 430*a* and 430*b* in the imaging area thereof even when the lower traveling body 430 of the work machine 40 revolves. That is, it is possible for at least one of the first imaging device 50 and the second imaging device 60 to image the drive member 431 that is a designated component provided to the lower traveling body 430.

It is sufficient if the first imaging device 50 and the second imaging device 60 are installed to image the external appearance of the work machine 40 in respective different optical axis directions. The first imaging device 50 and the second imaging device 60 may be, for example, actual machine imaging devices 412 mounted on the other work machine 40.

In addition, the number of first imaging devices 50 and the number of second imaging devices 60 may be increased as appropriate in accordance with a form of practice. For example, when the work machine 40 is assumed to move, it is also favorable to install the first imaging devices 50 and the second imaging devices 60 as appropriate to allow at least one of the first imaging devices 50 and the second imaging devices 60 to include a side surface of any of the pair of crawlers 430*a* and 430*b* in the imaging area thereof even in the moving destination of the work machine 40.

Figure 5:
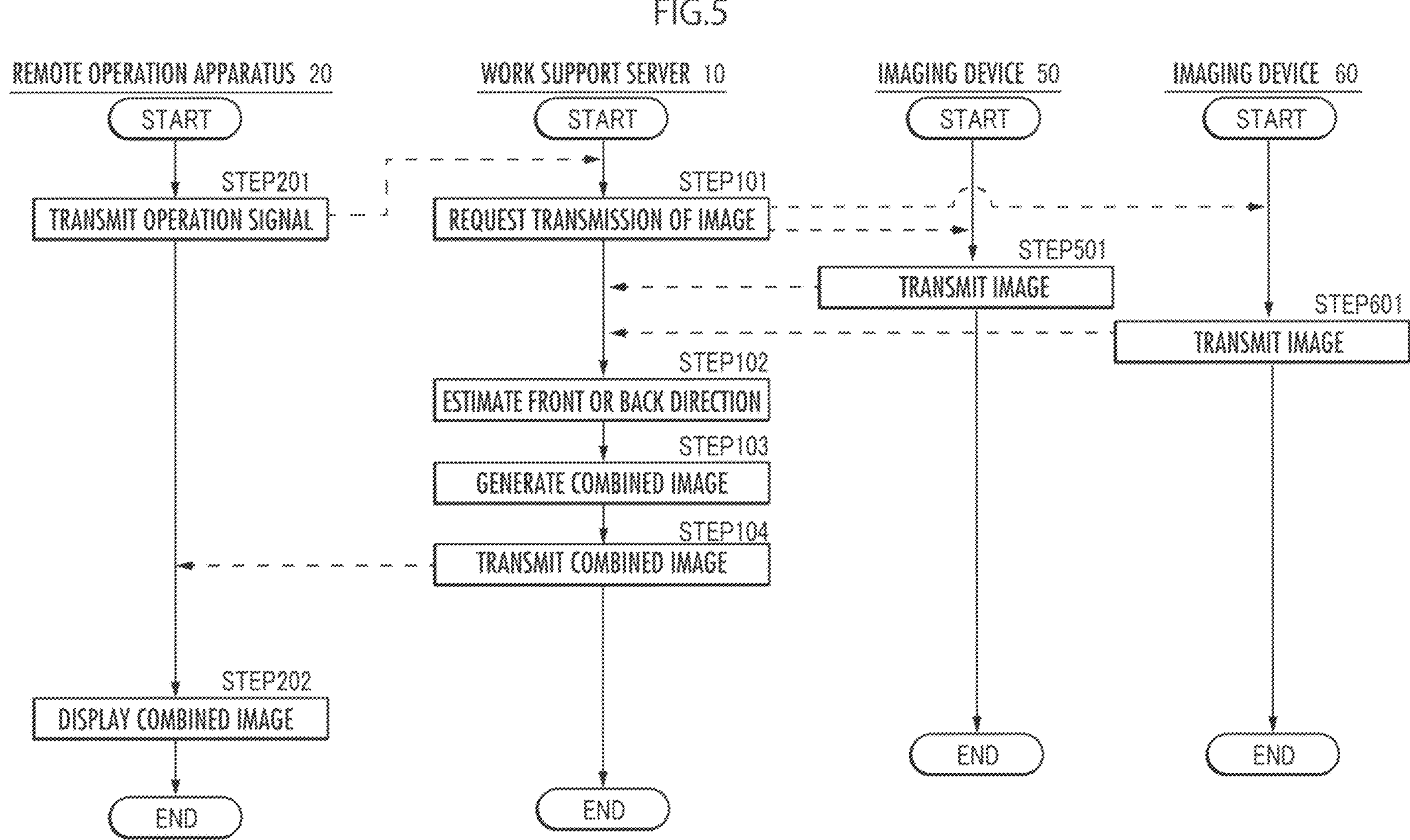
FIG. 5 is a flowchart illustrating work support processing of the work support system.

FIG. 5 is a flowchart illustrating work support processing of the work support system that is attained by cooperating the work support server 10, the remote operation apparatus 20, the work machine 40, the first imaging device 50, and the second imaging device 60 described above.

The work support system is triggered by a start of the remote operation apparatus 20 to begin the work support processing. When an operator turns off, for example, the cutoff lever, the remote operation apparatus 20 transmits an operation signal to the work support server 10 (STEP 201).

Once receiving the operation signal, the work support server 10 transmits image transmission requests to the first imaging device 50 and the second imaging device 60 (STEP 101).

Once receiving an image transmission request, the first imaging device 50 transmits an image that has been taken to the work support server 10 (STEP 501).

Once receiving the image transmission request, the second imaging device 60 transmits an image that has been taken to the work support server 10 (STEP 601).

Once receiving the image (first captured image) captured by the first imaging device 50 and the image (second captured image) captured by the second imaging device 60, the support processing element 101 of the work support server 10 estimates the forward direction or the backward direction of the lower traveling body 430 in the first captured image or the second captured image in which the pair of crawlers 430*a* and 430*b* appear based on the mode of the appearance of the lower traveling body in the first captured image taken by the first imaging device 50 or the second captured image taken by the second imaging device 60 and the modes of the appearances of designated components unevenly disposed in the front or back directions of the pair of respective crawlers 430*a* and 430*b* in the first captured image taken by the first imaging device 50 or the second captured image taken by the second imaging device 60 (STEP 102).

For example, when any of the drive members 431 that are designated components of the lower traveling body 430 appears in the first captured image in the processing of STEP 102, the support processing element 101 estimates one of the front and back directions of the crawlers 430*a* and 430*b* in which the drive member 431 is positioned in a side view of any of the crawlers 430*a* and 430*b* as the backward direction of the crawlers 430*a* and 430*b* in the first captured image.

For example, it is possible for the support processing element 101 to estimate the one of the front and back directions in which the drive member 431 is positioned as the backward direction of the crawlers 430*a* and 430*b* by using a learning model that is constructed in advance through machine learning (e.g., supervised learning) and stored in the database 110. Specifically, a plurality of captured images obtained by imaging the external appearance of the work machine 40 from a variety of angles is used to lean the backward direction of the crawlers 430*a* and 430*b* among the front and back directions of the crawlers 430*a* and 430*b* in side views of the crawlers 430*a* and 430*b* for respective captured images in which sides of the crawlers 430*a* and 430*b* appear.

The support processing element 101 inputs the first captured image or the second captured image to the learning model to recognize a vector having the front or back direction of the crawlers 430*a* and 430*b* or the forward direction or the backward direction of the crawlers 430*a* and 430*b* of the lower traveling body 430 in areal space. The support processing element 101 estimates the forward direction or the backward direction of the lower traveling body 430 in the first captured image or the second captured image.

For example, when none of the drive members 431 that are designated components of the lower traveling body 430 appear in the first captured image and any of the drive members 431 of the lower traveling body 430 appears in the second captured image in the processing of STEP 102, the support processing element 101 estimates one of the front and back directions of the crawlers 430*a* and 430*b* in which the drive member 431 is positioned in a side view of any of the crawlers 430*a* and 430*b* as the backward direction of the crawlers 430*a* and 430*b* of the lower traveling body 430 in the second captured image. This makes it possible to estimate the front or back direction of the crawlers 430*a* and 430*b* from the second captured image even when none of the drive members 431 appear in the first captured image because of the relationship between the optical axis direction of the first imaging device 50 and the front and back directions.

In addition, the support processing element 101 of the work support server 10 generate a combined image (STEP 103) and transmits the generated combined image to the remote operation apparatus 20 (STEP 104). In the combined image, an index image is superimposed at least partially on the work machine 40 or the region therearound in at least one of the first captured image, the second captured image, and a main image. The index image indicates the forward direction or the backward direction of the lower traveling body 430 in the first captured image or the second captured image. The forward direction or the backward direction of the lower traveling body 430 is estimated in STEP 102.

Figure 6:
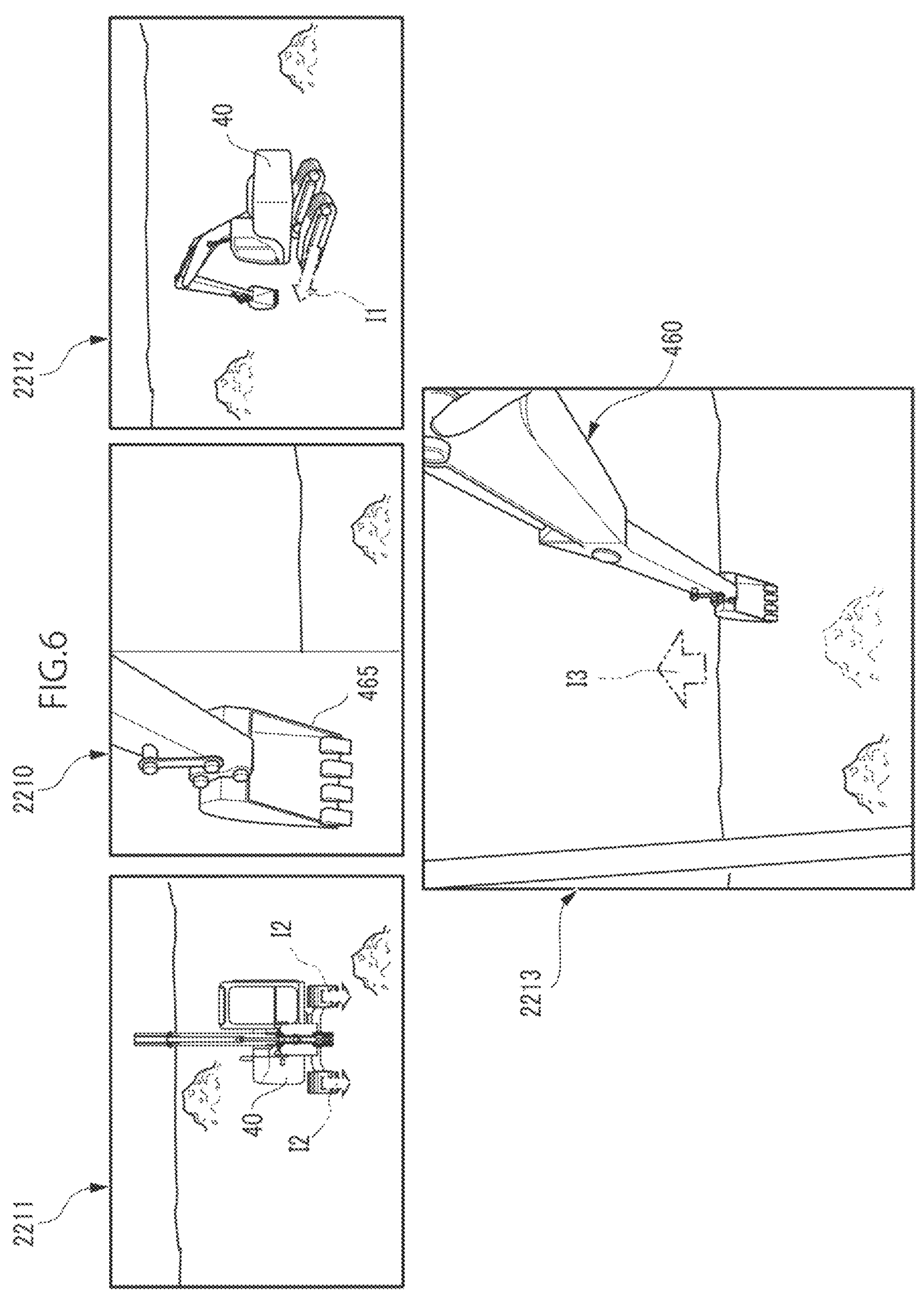
FIG. 6 is an explanatory diagram illustrating a display mode of an image output device of the remote operation apparatus in FIG. 2.

For example, the support processing element 101 generates a combined image in which an index image I1 is superimposed on the first captured image that has been taken by the first imaging device 50 and displayed on the right image output device 2212 in FIG. 6. For example, in FIG. 6, the index image I1 indicates the forward direction of the lower traveling body 430 in the first captured image.

For example, when any of the drive members 431 of the lower traveling body 430 appears in the first captured image and the second captured image, it is possible for the support processing element 101 to generate combined images in which the index images I1 and I2 are superimposed based on the direction estimated through the front or back direction estimating processing of STEP 102 described above.

In addition, when none of the drive members 431 of the lower traveling body 430 appear in the first captured image obtained through the first imaging device 50 that is one imaging device, the support processing element 101 may superimpose the index images I1 and I2 on the first captured image. The index images I1 and I2 are each generated based on the mode of the appearance of the lower traveling body 430 and the mode of the appearance of any of the drive members 431 in the second captured image obtained through the second imaging device 60 that is another imaging device. The index images I1 and I2 each indicate the front or back direction of the lower traveling body 430.

That is, the support processing element 101 generates a combined image in which the index images I1, I2, and I3 are superimposed at least partially on the work machine 40 or the region therearound in at least one captured image among the first captured image, the second captured image, and the main image in association with the front or back direction of the lower traveling body 430 estimated through the front or back direction estimating processing of STEP 102.

Specifically, the support processing element 101 generates a combined image in which, for example, the index image 2 is superimposed on the second captured image that has been taken by the second imaging device 60 and displayed on the left image output device 2211 in FIG. 6. Further, the support processing element 101 generates a combined image in which the index image I3 is superimposed on the main image that has been taken by the main camera 412 and displayed on the lower image output device 2213 in FIG. 6.

Figure 7:
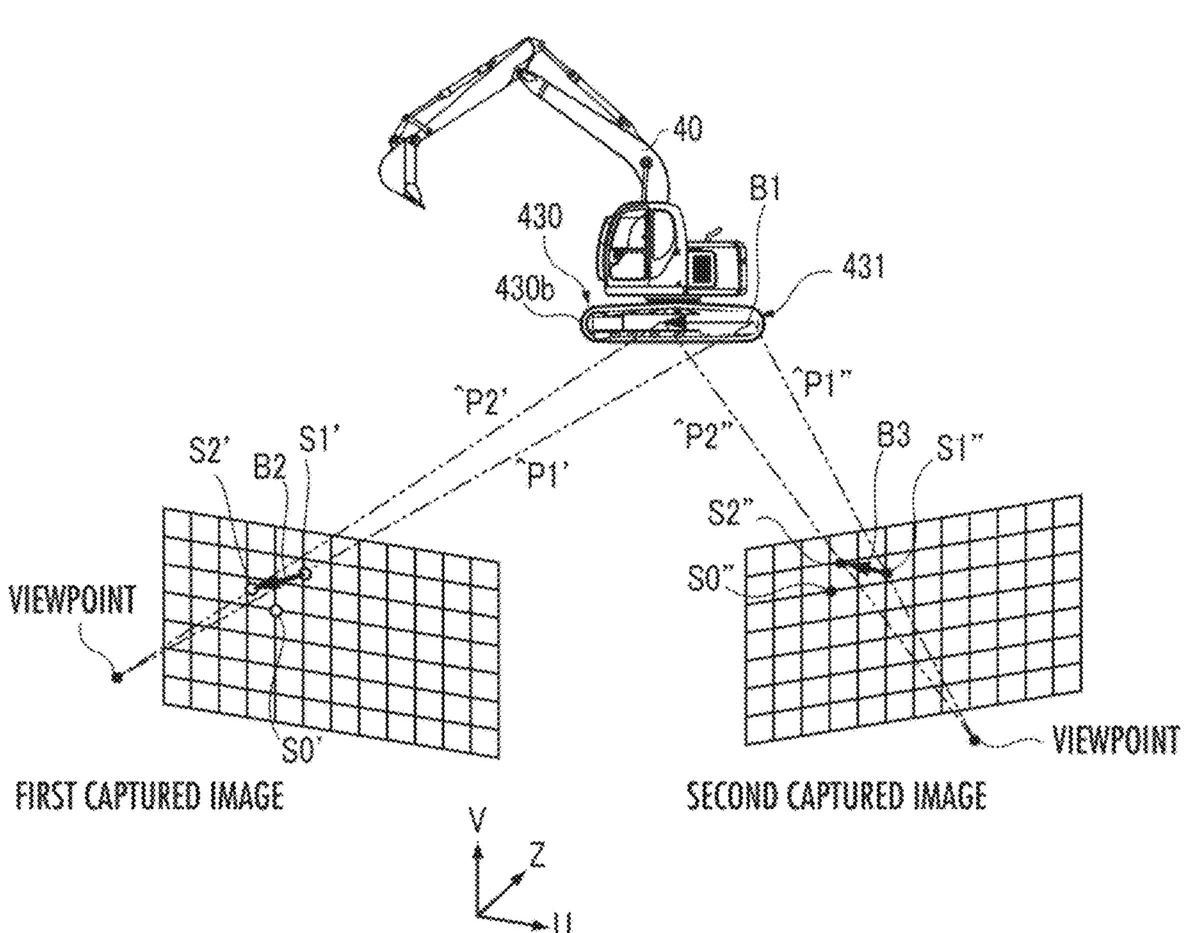
FIG. 7 is an explanatory diagram of combined-image generation processing in FIG. 5.

For example, it is favorable to superimpose an index image indicating the front or back direction of the lower traveling body 430 recognized based on the second captured image on the first captured image as follows. As illustrated in FIG. 7, the support processing element 101 obtains a vector B1 having the forward direction of the crawler 430*b* in a real space through the processing of STEP 102 described above.

For example, the support processing element 101 may obtain a vector B2 in a coordinate system of the first captured image by performing coordinate transformation for the vector B1.

Specifically, a vector B having the forward direction of the crawler 430*b*=RB+T based on a coordinate system of the real space is calculated based on a rotation matrix R and a translation matrix T that represent coordinate transformation from a coordinate system of the second captured image to the coordinate system of the first captured image. The rotation matrix R and the translation matrix T are saved in the database 110 in advance. The rotation matrix R and the translation matrix T may be each defined by using a quaternion that is mathematically equivalent thereto.

A point position S1' resulting from the coordinate transformation of a starting point of the vector B1 in the real space into the coordinate system of the first captured image is obtained.

The starting point of the vector B1 based on the coordinate system of the first captured image is represented as a vector ^p1"=DS1'^e"(S1'). "^" means a vector (the same applies below). "^e"(S1")" is a unit vector indicating the line-of-sight direction of the first imaging device 50 passing through the position S1' of a pixel in the coordinate system of the first captured image.

Similarly, a point position S2' resulting from the coordinate transformation of an ending point of the vector B1 in the real space into the coordinate system of the first captured image is obtained.

The ending point of the vector B1 based on the coordinate system of the first captured image is represented as a vector ^p2"=DS2"^e'(S2'). "^" means a vector (the same applies below). "^e"(S2")" is a unit vector indicating the line-of-sight direction of the first imaging device 50 passing through the position S2" of a pixel in the coordinate system of the first captured image.

Similarly, it is possible for the support processing element 101 to obtain a vector B3 in the coordinate system of the second captured image by performing coordinate transformation for the vector B1.

A point position S1" resulting from the coordinate transformation of the starting point of the vector B1 in the real space into the coordinate system of the second captured image is obtained.

The starting point of the vector B1 based on the coordinate system of the second captured image is represented as a vector ^p1"=DS1"^e'(S1"). "^" means a vector (the same applies below). "^e"(S1")" is a unit vector indicating the line-of-sight direction of the second imaging device 60 passing through the position S1" of a pixel in the coordinate system of the first captured image.

Similarly, a point position S2" resulting from the coordinate transformation of the ending point of the vector B1 in the real space into the coordinate system of the second captured image is obtained.

The ending point of the vector B1 based on the coordinate system of the first captured image is represented as a vector ^p2"=DS2"^e"(S2"). "^" means a vector (the same applies below). "^"(S2")" is a unit vector indicating the line-of-sight direction of the second imaging device 60 passing through the position S2" of a pixel in the coordinate system of the first captured image.

In the coordinate system of the first captured image, the coordinate positions S1' and S2'(see white circles in FIG. 7) do not generally match a position S0' of a pixel (see a black circle in FIG. 7). This assigns a distance (actual point distance) Zs to the position S0' of each pixel in a reference image coordinate system in accordance with a publicly known interpolation method such as the nearest neighbor interpolation method, the bilinear interpolation method, or the bicubic spline method. The distance (actual point distance) Zs is determined based on a distance ZS" corresponding to a coordinate position S0".

In this way, the vector B2 resulting from the coordinate transformation of the vector B1 in the coordinate system of the real space into the coordinate system of the first captured image is obtained. It is to be noted that such generation of a combined image similarly allows an index image indicating the front or back direction of the lower traveling body 430 to be superimposed on the main image.

The remote operation apparatus 20 displays a received combined image on the image output device 221 (STEP 202). It is possible to display the combined image on any image output device of the image output device 221. For example, the combined image may be displayed on any image output device among the middle image output device 2210, the left image output device 2211, the right image output device 2212, and the lower image output device 2213.

For example, in a display example illustrated in FIG. 6, the middle image output device 2210 has a screen region divided into the two of the right and the left. The left screen region displays an enlarged image of the bucket 465 taken by the attachment camera 412*b*. In addition, the right screen region of the middle image output device 2210 displays a back image taken by the back camera 412*c*.

The right image output device 2212 displays a combined image in which the index image I1 is superimposed on the first captured image taken by the fast imaging device 50.

The left image output device 2211 displays a combined image in which the index image I2 is superimposed on the second captured image taken by a second imaging, device 60.

The lower image output device 2213 displays a combined image in which the index image I1 is superimposed on the main image taken by the main camera 412*a*.

It is to be noted that the display modes of the index images I1, I2, and I3 are not each limited to a display mode indicating the forward direction of the lower traveling body 430. For example, the backward direction of the lower traveling body 430 may be indicated. In addition, the index images I1, I2, and I3 may be each represented as a double arrow indicating the forward direction and the backward direction of the lower traveling body 430. When the index images I1, I2, and I3 are each represented as a double arrow in this way, it is favorable to display the double arrow in a mode that allows the forward direction and the backward direction to be distinguished from each other. For example, when the index images I1, I2, and I3 are each represented as a double arrow, it is favorable to indicate the forward direction and indicate the backward direction by using a dashed line.

Figure 8:
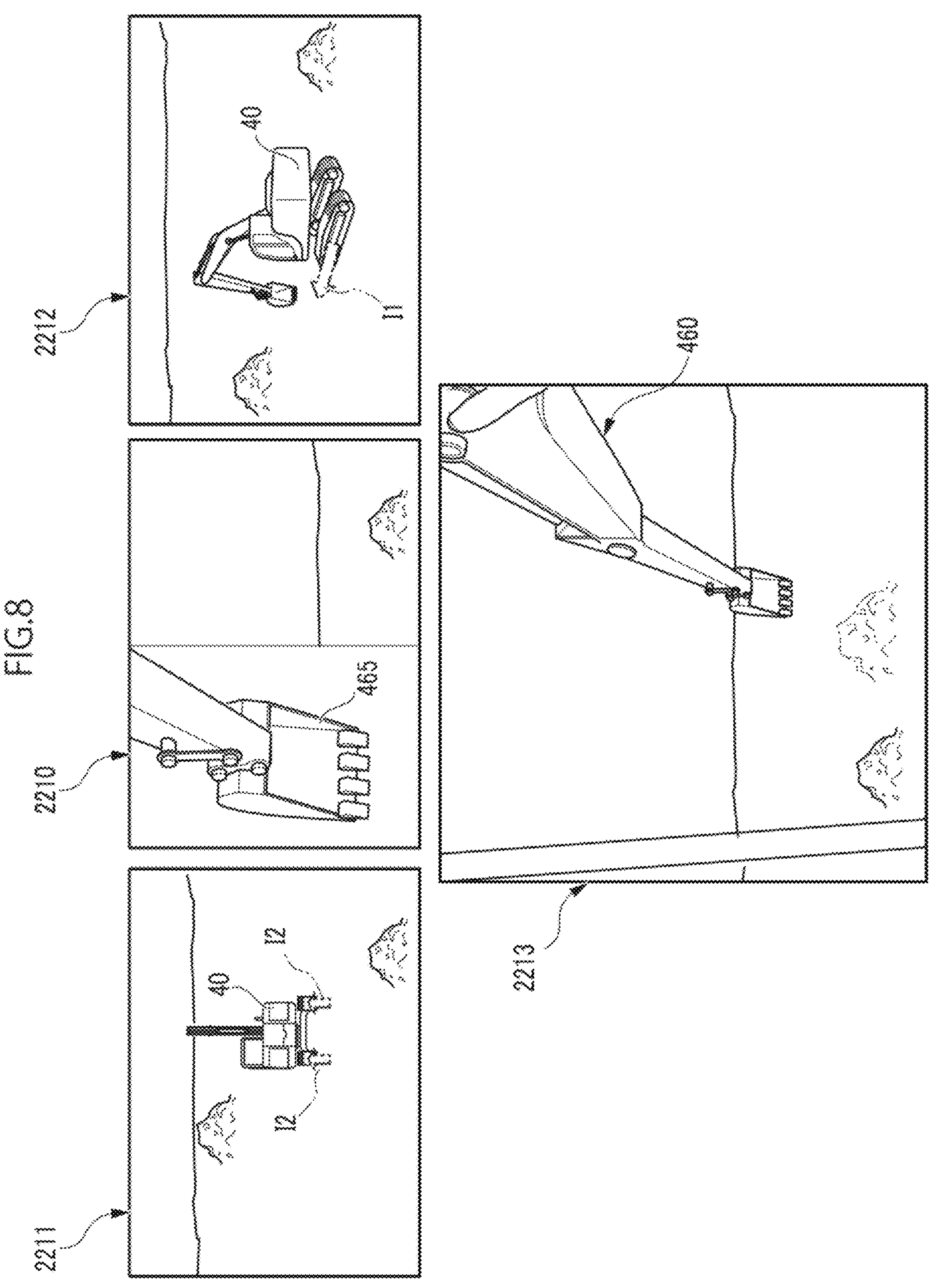
FIG. 8 is an explanatory diagram illustrating another display mode of the image output device of the remote operation apparatus in FIG. 2.

In addition, it is favorable to adjust the size or the like of an index image in a combined image as appropriate in accordance with the position, size, and the like of any of the crawlers 430*a* and 430*b* that appears in the image in which the index image is superimposed. For example, when the work machine 40 that appears in the second captured image of the left image output device 2211 is smaller than the work machine 40 that appears in the first captured image of the right image output device 2212 as illustrated in FIG. 8, it is favorable to adjust the size of the index image I2 to make the index image I2 smaller than the index image I1 and superimpose the index image I2 in accordance with the sizes and the widths of the crawlers 430*a* and 430*b* in the second captured image.

In this way, it is favorable that the support processing element 101 generate each of the index images I1, I2, and I3 in accordance with the sizes of the crawlers 430*a* and 430*b* in a combined image and the positions of the crawlers 430*a* and 430*b* in the combined image.

When the plurality of work machines 40 is disposed close to each other, it is favorable to identify the work machine 40 that is an operation target and then perform the work support processing described above.

For example, as illustrated in FIG. 9, the work support system is triggered by a start of the remote operation apparatus 20 to begin the work support processing. When an operator turns off for example, the cutoff lever, the remote operation apparatus 20 transmits an operation signal to the work support server 10 (STEP 211).

Once receiving the operation signal, the work support server 10 requests the transmission of positional information related to the position in a real space from the work machine 40 that is an operation target (STEP 111).

Once receiving a transmission request of the positional information related to the position in the real space, the work machine 40 obtains the positional information related to the position in the real space through the GNSS (Global Navigation Satellite System) (STEP 411) and transmits the positional information related to the position in the real space and machine information (e.g., an identification symbol such as an A-numbered machine, an identification number such as a production number, and the like) that is identification information related to the work machine to the work support server 10 together (STEP 412).

Once receiving the positional information related to the position in the real space, the work support server 10 selects an imaging device capable of imaging the work machine 40 with reference to the pieces of positional information related to the positions of the imaging devices disposed around the work machine 40 in the real space and transmits an image transmission request, for example, to the first imaging device 50 that is the one imaging device selected by this selection (STEP 112).

Once receiving the image transmission request, the first imaging device 50 transmits the first captured image that has been taken to the work support server 10 (STEP 511).

Once receiving the first captured image, the support processing element 101 of the work support server 10 estimates the position of the work machine 40 in the real space based on the installation position of the fast imaging device 50 in the real space which is registered in the database 110 in advance and the position of the work machine 40 that appears in the fast captured image (STEP 113).

The support processing element 101 of the work support server 10 determines whether or not the positional information related to the position in the real space which is transmitted from the work machine 40 matches the position (positional information) of the work machine 40 in the real space which estimated in STEP 113 (STEP 114).

For the determination in STEP 114, for example, the support processing element 101 obtains the positional information related to the position of the first imaging device 50 in the real space and the optical axis direction of the first imaging device 50. The support processing element 101 estimates the direction in which the work machine 40 is disposed as viewed from the installation position of the first imaging device 50 based, on, the optical axis direction of the first imaging device 50. The support processing element 101 calculates pieces of positional information related to positions in the real space in the estimated direction of the work machine 40 within a predetermined range (e.g., within 200 m from the first imaging device 50 and within a radius of 20 m from the center in the direction). The support processing element 101 makes a determination in accordance with whether or not the plurality of pieces of calculated positional information related to the positions in the real space includes positional information that matches the positional information related to the position in the real space which transmitted from the work machine 40.

When determining in STEP 114 that the two pieces of positional information match each other (STEP 114: YES), the support processing element 101 recognizes the work machine 40 as the work machine 40 that is an operation target (STEP 115) and transmits a combined image to the remote operation apparatus 20 (STEP 116).

That is, the support processing element 101 obtains the positional information related to the position of the work machine 40 that is a candidate for the operation target in the real space and recognizes the work machine 40 that is the candidate for the operation target as the work machine 40 that is the operation target when the position of the work machine 40 calculated from the first captured image matches the positional information related to the position of the work machine 40 that is the candidate for the operation target in the real space.

The remote operation apparatus 20 displays a received combined image on the image output device 221 (STEP 212).

In contrast, when determining in STEP 114 that the two pieces of positional information related to the positions in the real space do not match each other (STEP 114: NO), the support processing element 101 returns to STEP 112 and repeats the processing until the two pieces of positional information related to the positions in the real space match each other in STEP 114.

In the description of the first embodiment above, it has been described that the work support processing is executed by the work support server 10. The work support processing may be, however, performed by the remote operation apparatus 20 or the work machine 40.

In the description of the first embodiment above, the support processing element 101 estimates the front or back direction from the second captured image in the processing of STEP 102 when none of the drive members 431 that are designated components of the lower traveling body 430 appear in the first captured image, but this is not limitative. For example, one of the front and back directions of the crawlers 430*a* and 430*b* in which no designated component is disposed in a side view of any of the crawlers 430*a* and 430*b* in the first captured image may be estimated as front. Specifically, when parts (an end in the one of the front and back directions of the crawlers 430*a* and 430*b* in which no designated component is disposed) unevenly disposed in the front or back direction of the lower traveling body 430 appear in the first captured image and none of the drive members 431 that are designated components of the lower traveling body 430 appear in the first captured image, the support processing element 101 may estimate the one (the one of the front and back directions in which the drive member 431 is not present) of the front and back directions of the crawler 430*a* or 430*b* in which the unevenly disposed parts are positioned in a side view of any of the crawlers 430*a* and 430*b* as the forward direction of the crawlers 430*a* and 430*b* of the lower traveling body 430 in the first captured image. This makes it possible to estimate the front or back direction even when a designated component such as the drive member 431 hides behind an obstacle or the like and does not appear in the first captured image.

In addition, it has been described that it is possible for the support processing element 101 to estimate the one of the front and back directions in which the drive member 431 is positioned as the backward direction of the crawlers 430*a* and 430*b* by using a learning model that is constructed in advance through machine learning (e.g., supervised learning) and stored in the database 110. The estimation of the front or back direction of the crawlers 430*a* and 430*b* is not limited to such a mode. For example, the support processing element 101 may recognize the inclination of the vector having the forward direction or the backward direction of the lower traveling body 430 based on the apparent shape of any of the crawlers 430*a* and 430*b* in a side view of the crawler 430*a* or 430*b*.

Figure 10:
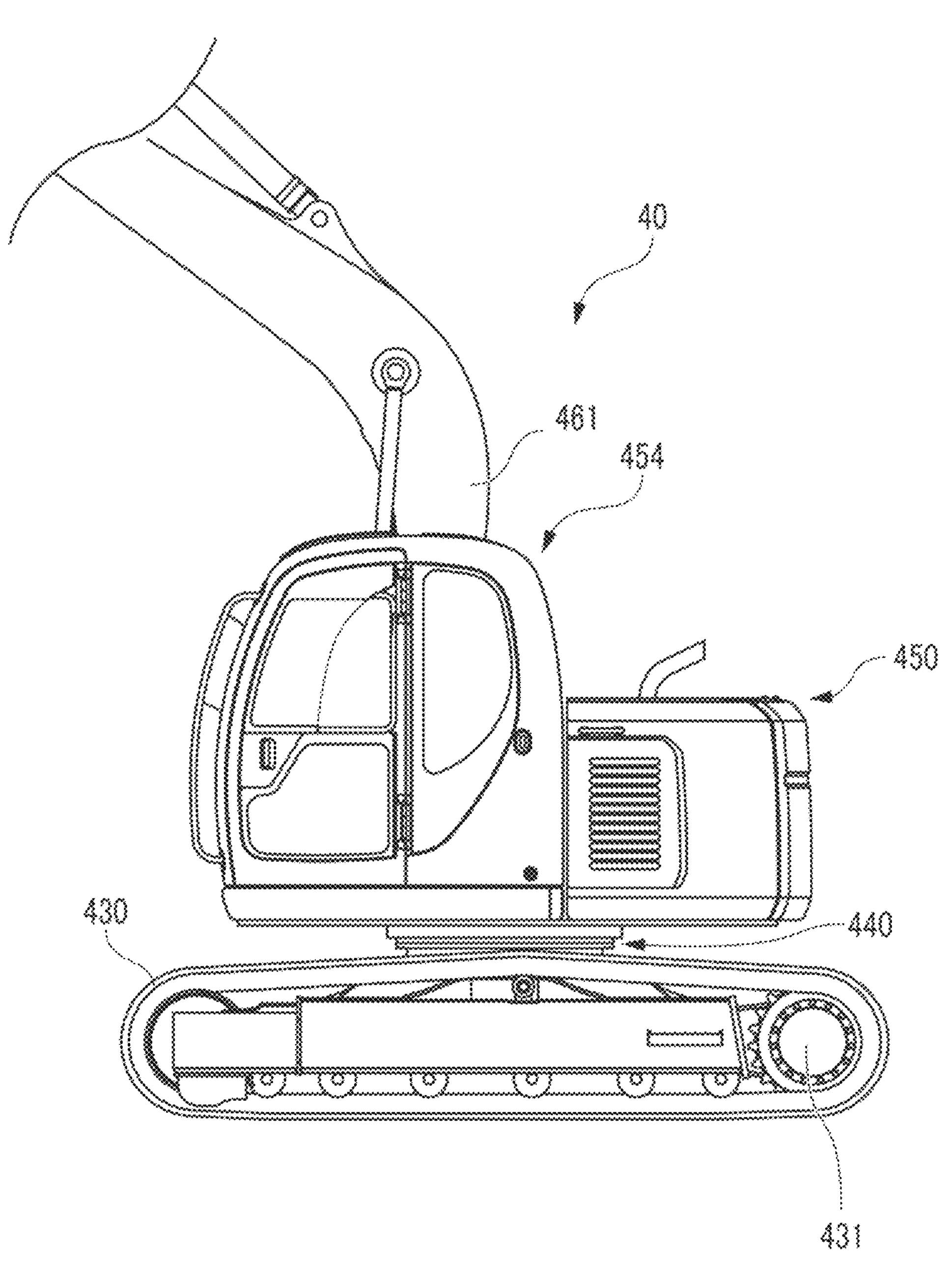
FIG. 10 is an explanatory diagram illustrating a first display mode of a first captured image.

Specifically, when only a side of any of the crawlers 430*a* and 430*b* appears in the first captured image as in FIG. 10, the support processing element 101 recognizes that the vector has an inclination in the direction vertical to an optical axis AX1 of the fast imaging device 50.

Figure 11:
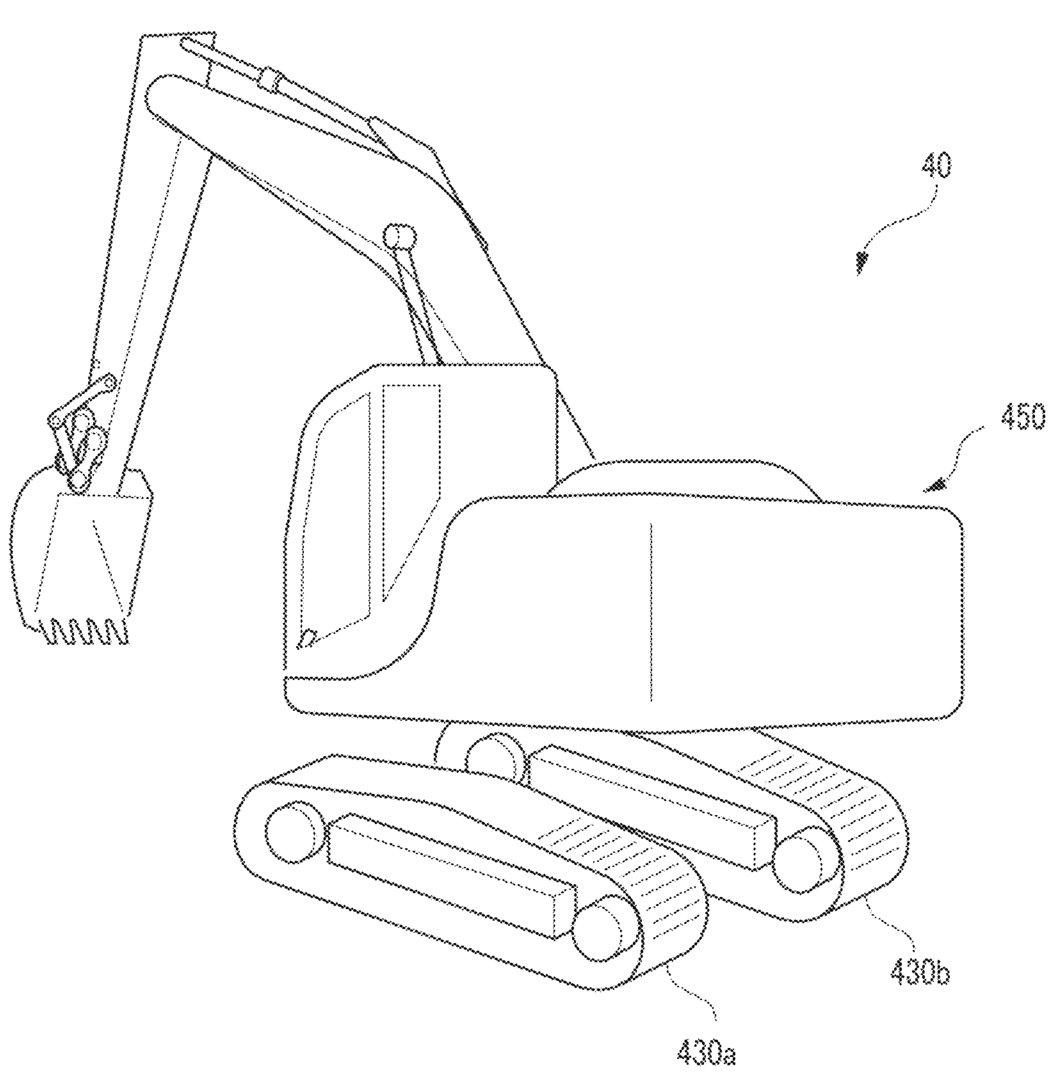
FIG. 11 is an explanatory diagram illustrating a second display mode of the first captured image.

In addition, when both the crawlers 430*a* and 430*b* are recognized and the crawler 430*b* appears in the first captured image to overlap with an end of the crawler 430*a* (the outer side surface of the crawler 430*a* that is one of the crawlers and the inner side surface of the other crawler 430*b* appear) as in FIG. 11, a fast support processing element 1011 recognizes a vector having an inclination with respect to the optical axis AX1 of the first imaging device 50.

Specifically, in the example illustrated in FIG. 11, the first support processing element 1011 recognizes that the vector has an inclination to position the end at which the crawler 430*a* overlaps with the crawler 430*b* as viewed from the direction of the optical axis AX1 of the first imaging device 50 (that is the right of the first captured image of FIG. 11 and an end of each of the crawler 430*a* and the crawler 430*b* in the extending direction) relatively close to the front (the lower side of the first captured image of FIG. 11) with respect to the optical axis AX1 of the first imaging device 50 and position the other end of the crawler 430*a* opposite to the end (that is the left of the first captured image of FIG. 11 and the other end of each of the crawler 430*a* and the crawler 430*b* in the extending direction) relatively close to the back with respect to the optical axis of the first imaging device 50 (the upper side of the first captured image of FIG. 11).

Figure 12:
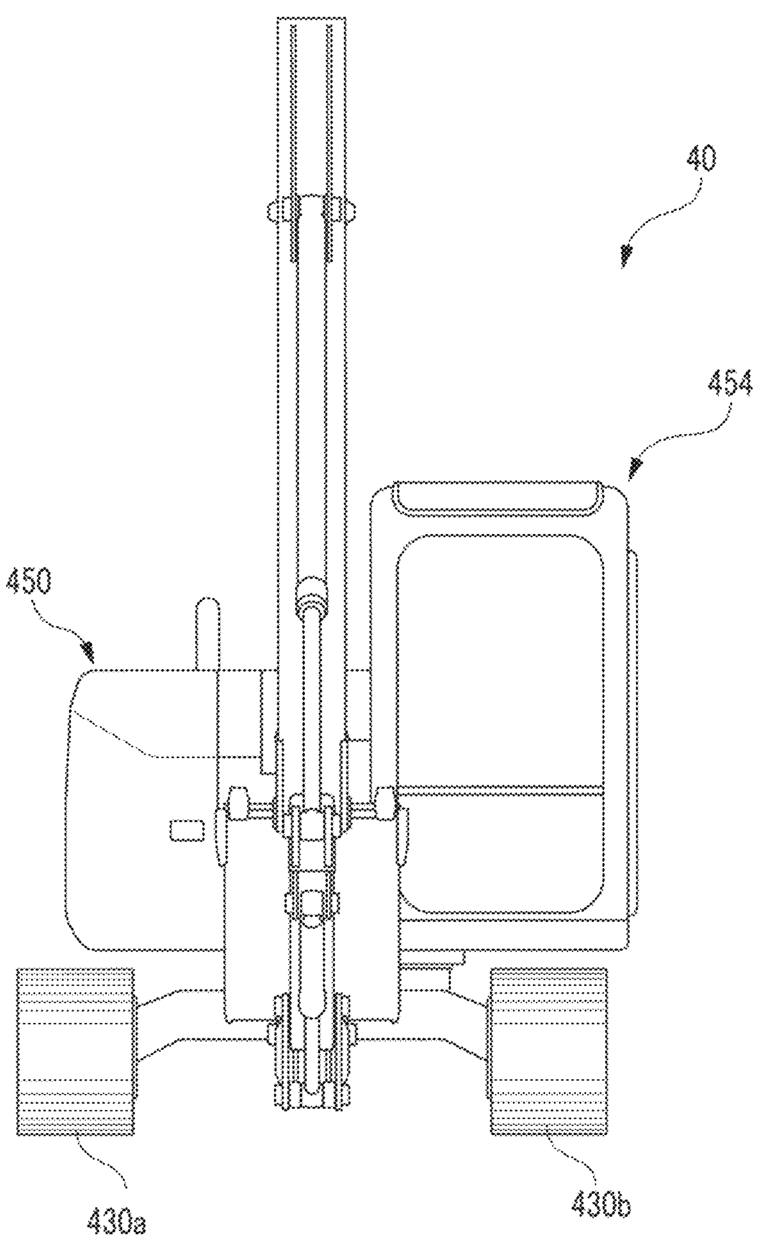
FIG. 12 is an explanatory diagram illustrating a third display mode of the first captured image.

When the first support processing element 1011 recognizes both the crawlers 430*a* and 430*b* and the crawlers 430*a* and 430*b* appear in the first captured image to prevent overlapping as in FIG. 12 (when the front direction or the back direction of the crawlers 430*a* and 430*b* is shown), the first support processing element 1011 recognizes that the vector has an inclination in the direction along the optical axis AX1 of the first imaging device 50 or the direction along the direction opposite to the optical axis AX1.

It is possible for the first support processing element 1011 to estimate the backward direction of the crawlers 430*a* and 430*b* by performing the processing as described above.

Second Embodiment (Configuration of Remote Operation System)

A work support system serving as an embodiment of the present invention illustrated in FIG. 13 includes the work support server 10 for supporting remote operations on the plurality of work machines 40 by the remote operation apparatus 20. The work support server 10, the remote operation apparatus 20, and the plurality of work machines 40 are each configured to be communicable with each other through a common network or different networks. In FIG. 1, the work support server 10 is connectable to the plurality of work machines 40, but it is sufficient if the work support server 10 is connectable to the one or more work machines 40 and the number of connectable work machines 40 is not limited.

The second embodiment is a remote operation system having respective mutual communication functions of causing the work support server 10 to communicate with the plurality of work machines 40 and the remote operation apparatus 20 for remotely operating one of the plurality of work machines 40 which is a remote operation target.

"Obtaining" various kinds of information by a component (hardware) according to the present invention is a concept that encompasses any calculation processing for preparing the various kinds of information in a form in which the information is usable in subsequent calculation processing such as receiving the information, reading or retrieving the information from an internal storage device (e.g., a memory) and/or an external storage device (e.g., an external database server), or executing calculation processing, for example, on the received, read, or retrieved information to, for example, calculate, estimate, predict, or identify the information.

(Configuration of Work Support Server)

The work support server 10 comprises the remote operation support device 100, the database 110, and the server wireless communication device 122. The remote operation support device 100 includes the first support processing element 1011 and a second support processing element 1012.

The first support processing element 1011 and the first support processing element 1012 each include a processing unit (a single-core processor or a multi-core processor, or the processor core or the processor cores included therein). The first support processing element 1011 and the first support processing element 1012 each read necessary data and software from a storage device such as a memory and execute calculation processing compliant with the software on the data. The calculation processing will be described below.

The database 110 stores and holds the pieces of data or the like of captured images. The database 110 may include a database server different from the work support server 10.

(Configuration of Remote Operation Apparatus)

The remote operation apparatus 20 comprises the remote control device 200, the remote input interface 210, and the remote output interface 220. The remote control device 200 includes a processing unit (a single-core processor or a multi-core processor, or the processor core or the processor cores included therein). The remote control device 200 reads necessary data and software from a storage device such as a memory and executes calculation processing compliant with the software on the data.

The remote input interface 210 comprises the remote operation mechanism 211 and a sixth imaging device 212.

The remote operation mechanism 211 includes a traveling operation device, a revolving operation device, a boom operation device, an arm operation device, a bucket operation device, and a hydraulic lock lever (cutoff lever) that switches an acceptance state of an operation by an operator. Each of the operation devices includes an operation lever that receives a rotating operation. An operation lever (travel lever) of the traveling operation device is operated to move the lower traveling body 430 comprising a pair of left and right crawlers of the work machine 40. The travel lever may also serve as a travel pedal. For example, there may be provided a travel pedal fixed at a base or a lower end of the travel lever. The operation lever (revolving lever) of the revolving operation device is operated to move a hydraulic revolution motor included in the revolving mechanism 440 of the work machine 40. The operation lever (boom lever) of the boom operation device is operated to move the boom cylinder 462 of the work machine 40. The operation lever (arm lever) of the arm operation device is operated to move the arm cylinder 464 of the work machine 40. The operation lever (bucket lever) of the bucket operation device is operated to move the bucket cylinder 466 of the work machine 40. The cutoff lever is operated to switch a state of a pilot pressure valve of the work machine 40.

Figure 14:
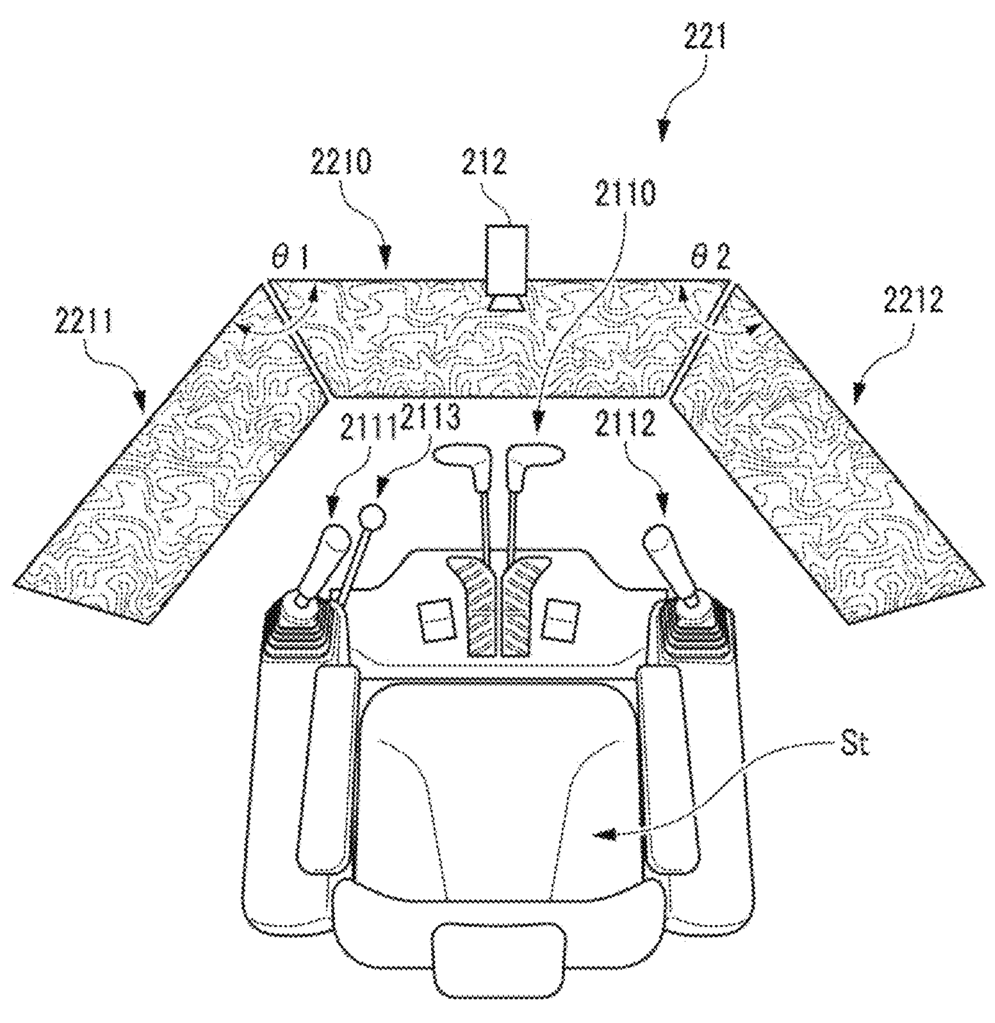
FIG. 14 is an explanatory diagram for a configuration of a remote operation apparatus in FIG. 13.

The respective operation levers included in the remote operation mechanism 211 are disposed around the seat St on which the operator OP1 sits down, for example, as illustrated in FIG. 14. The seat St is formed like a high back chair with armrests, but may be a seating section having any form that allows the operator OP1 to sit down thereon such as the form of a low back chair with no headrest or the form of a chair with no backrest.

The pair of left and right travel levers 2110 corresponding to the left and right crawlers are disposed laterally side by side in front of the seat St. One operation lever may serve as a plurality of operation levers. For example, the left operation lever 2111 provided in front of the left frame of the seat St illustrated in FIG. 14 may function as an arm lever when operated in the front or back direction, and may function as a revolving lever when operated in the left or right direction. Similarly, the right operation lever 2112 provided in front of the right frame of the seat St illustrated in FIG. 14 may function as a boom lever when operated in the front or back direction, and may function as a bucket lever when operated in the left or right direction. The lever patterns may be optionally changed in accordance with an operation instruction of the operator OP1.

A cutoff lever 2113 that is provided below the left operation lever 2111 in front of the left frame of the seat St functions as an operation lever for locking the respective operation levers 2110, 2111, and 2112 when raised (turned oft) to prevent the work machine 40 from moving even when the operation levers 2110, 2111, and 2112 are operated, while unlocking the respective operation levers 2110, 2111, and 2112 when lowered (turned on).

The remote output interface 220 comprises an image output device 221 and the remote wireless communication device 222.

The remote image output device 221 includes a middle remote image output device 2210, a left remote image output device 2211, and a right remote image output device 2212 each including a screen having a substantially rectangular shape. The middle remote image output device 2210, the left remote image output device 2211, and the right remote image output device 2212 are respectively disposed in front of the seat St, in front of and to the left of the seat St, and in front of and to the right of the seat St, for example, as illustrated in FIG. 14. The respective screens (image display regions) of the middle remote image output device 2210, the left remote image output device 2211, and the right remote image output device 2212 may be the same or different in shape and size.

The respective screens of the middle remote image output device 2210, the left remote image output device 2211, and the right remote image output device 2212 may be parallel with the perpendicular direction or may be inclined with respect to the perpendicular direction. At least one image output device of the middle remote image output device 2210, the left remote image output device 2211, and the right remote image output device 2212 may include an image output device divided into a plurality of image output devices. For example, the middle remote image output device 2210 may include a pair of image output devices that each include a screen having a substantially rectangular shape and are vertically adjacent to each other.

A remote sound output device 222 includes one or more speakers. The remote sound output device 222 includes a middle remote sound output device 2220, a left remote sound output device 2221, and a right remote sound output device 2222 that are respectively disposed behind the seat St, at the back of the left armrest, and at the back of the right armrest, for example, as illustrated in FIG. 14. The respective specifications of the middle remote sound output device 2220, the left remote sound output device 2221, and the right remote sound output device 2222 may be the same or different.

The sixth imaging device 212 is provided, for example, to allow the seat St and the remote operation mechanism 211 to be imaged. The sixth imaging device 212 is provided at the upper end of the middle remote image output device 2210 as also illustrated in FIG. 14 in this second embodiment to have the optical axis toward the seat St. That is, the sixth imaging device 212 is installed to allow an action of the operator OP1 for operating the remote operation mechanism 211 to be imaged when the operator OP1 sits down on the seat St.

(Configuration of Work Machine)

As illustrated in FIG. 13, the work machine 40 comprises the actual machine control device 400, an actual machine input interface 41, and an actual machine output interface 42. The actual machine control device 400 includes a processing unit (a single-core processor or a multi-core processor, or the processor core or the processor cores included therein). The actual machine control device 400 reads necessary data and software from a storage device such as a memory and executes calculation processing compliant with the software on the data.

Figure 15:
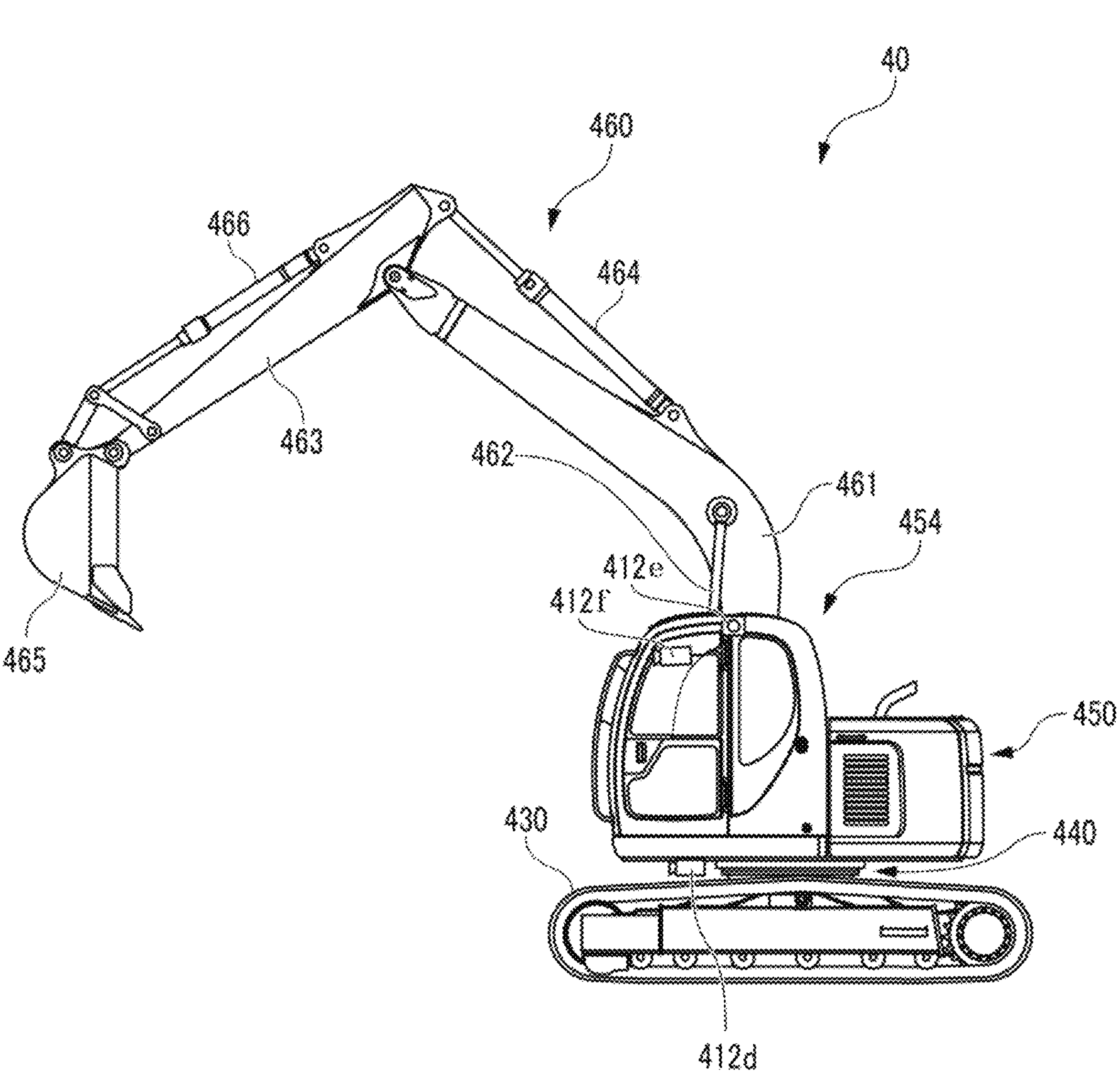
FIG. 15 is an explanatory diagram for a configuration of a work machine in FIG. 13.

The work machine 40 is, for example, a hydraulic, electric, or hybrid drive crawler excavator (construction machine). The hybrid drive is a combination of hydraulic and electric drives. As illustrated in FIG. 15, the work machine 40 comprises the lower traveling body 430 comprising a pair of left and right crawlers and the upper revolving body 450 that is revolvably mounted on the lower traveling body 430 with the revolving mechanism 440 interposed in between. The cab 454 (operator's room) is provided at the left front of the upper revolving body 450. The actuation mechanism 460 is provided at the middle front of the upper revolving body 450.

As also illustrated in FIG. 18B, there are provided first markers M1 at the fronts of the pair of respective crawlers 430*a* and 430*b* of the work machine 40 as designated components. In addition, as also illustrated in FIG. 22C, there are provided second markers M2 at the backs of the pair of respective crawlers 430*a* and 430*b* of the work machine 40 as designated components.

It is sufficient if each of the first markers M1 and the second marker M2 are markers that are distinguishable from each other. For example, the first marker M1 and the second marker M2 may be two-dimensional codes each holding front and back information, graphical figures such as a circle and a triangle, symbols, or the like. As long as the first marker M1 and the second marker M2 are markers that are distinguishable from each other, the first marker M1 and the second marker M2 may also each have, for example, a three-dimensional shape such as a step (a step on which an operator put a foot when entering the cab 454), a projection that is formed by protruding outwardly from a crawler or a recess formed by being recessed from the crawler. For example, when the first marker M1 and the second marker M2 are covered with dirt or the like, it is difficult to recognize the images of symbols, graphical figures, or the like. However, the first marker M1 and the second marker M2 having three-dimensional shapes allow for image recognition as long as forms corresponding to the three-dimensional shapes are apparent.

That is, the first marker M1 and the second marker M2 are respectively disposed unevenly in the front or back directions of the pair of respective crawlers 430*a* and 430*b* and have forms different from each other. It is to be noted that the first marker M1 and the second marker M2 are each stored in the database 110 as image data.

The actual machine input interface 41 comprises the actual machine operating mechanism 411, fourth imaging devices 412*d* and 412*e*, and a fifth imaging device 412*f*. The actual machine operating mechanism 411 comprises a plurality of operation levers around a seat disposed inside the cab 454. The plurality of operation levers is disposed as with the remote operation mechanism 211.

The cab 454 is provided with a drive mechanism or a robot that receives a signal corresponding to a mode of operating a remote operation lever and moves an actual machine operating lever based on the received signal.

As also illustrated in FIG. 15, the fourth imaging device (also referred to as a foot camera below) 412*d* is provided on the upper revolving body 450 to include at least one of the crawlers of the lower traveling body 430 in the imaging area. In this second embodiment, the foot camera 412*d* is provided on the bottom surface (outer wall surface) of the cab 454 of the upper revolving body 450. Specifically, the foot camera 412*d* is provided on the bottom surface (outer wall surface) of the cab 454 with a light receiver (imaging direction) pointed in the front direction in which the front window of the cab 454 is provided. It is to be noted that the foot camera 412*d* may be provided, for example, closer to the base end of the boom foot or the like.

It is preferable to dispose the plurality of fourth imaging devices pointed in directions different from each other in the revolution direction of the upper revolving body 450 with respect to the lower traveling body 430. In this second embodiment, the fourth imaging device (also referred to as a left camera below) 412*e* is provided in addition to the foot camera 412*d*. The foot camera 412*d* and the left camera 412*e* are installed in directions in which the respective optical axes are different. It is further preferable that the left camera 412*e* have, as the imaging area, an area which is not included in the imaging area of the foot camera 412*d*.

In other words, the foot camera 412*d* and the left camera 412*e* are provided to cause at least one of the foot camera 412*d* and the let camera 412*e* to include at least one of the first marker M1 and the second marker M2 in the imaging area even when the upper revolving body 450 has any angle with respect to the lower traveling body 430. For example, it is preferable that the respective optical axis directions of the foot camera 412*d* and the left camera 412*e* form an angle of about 90°. In this second embodiment, the left camera 412*e* is provided on the outer wall surface of the cab 454 with the light receiver (imaging direction) pointed in the direction in which the left side window of the cab 454 is provided.

It is to be noted that the left camera 412*e* may be provided, for example, on the outer wall surface of the cab 454 with the light receiver (imaging direction) pointed in the direction in which the right side window of the cab 454 is provided. In addition, the left camera 412*e* may be provided on the roof of the cab 454 or may be provided to allow an image of the outside (e.g., the right or the left) to be taken from the inside of the cab 454.

The fifth imaging device 412*f* (also referred to as a main camera below) is provided to the upper revolving body 450 in addition to the foot camera 412*d* and the left camera 412*e*. The main camera 412*f* is installed, for example, inside the cab 454 and images an environment including at least a portion of the actuation mechanism 460 through the front window and the pair of left and right side windows. The captured image may omit a portion or all of the front window (or the window frame) and the side windows.

An actual machine state sensor group 414 includes respective angle sensors for measuring a rotation angle (angle for moving up and down) of the boom 461 with respect to the upper revolving body 450, a rotation angle of the arm 463 with respect to the boom 461, and a rotation angle of the bucket 465 with respect to the arm 463, a revolution angle sensor for measuring the revolution angle of the upper revolving body 450 with respect to the lower traveling body 430, an external force sensor for measuring external force that acts on the bucket 465, a three-axis acceleration sensor for measuring three-axis acceleration that acts on the upper revolving body 450, and the like.

The actual machine output interface 42 comprises an actual machine image output device 421 and the actual machine wireless communication device 422. The actual machine image output device 421 is disposed, for example, near the front window inside the cab 454. The actual machine image output device 421 may be omitted. In addition, the actual machine wireless communication device 422 executes wireless communication between the work support server 10 and the work machine 40.

The actuation mechanism 460 serving as an actuation mechanism comprises the boom 461 that is attached to the upper revolving body 450 to be movable up and down, the arm 463 that is rotatably coupled to the tip of the boom 461, and the bucket 465 that is rotatably coupled to the tip of the arm 463. The actuation mechanism 460 is mounted with the boom cylinder 462, the arm cylinder 464, and the bucket cylinder 466 that each include a telescopic hydraulic cylinder. As work units, various attachments such as a nibbler, a cutter, and a magnet may be used in addition to the bucket 465.

The boom cylinder 462 is interposed between the boom 461 and the upper revolving body 450 to extend and retract by being supplied with hydraulic oil and cause the boom 461 to rotate in the direction in which the boom 461 moves up and down. The arm cylinder 464 is interposed between the arm 463 and the boom 461 to extend and retract by being supplied with hydraulic oil and cause the arm 463 to rotate around the horizontal axis with respect to the boom 461. The bucket cylinder 466 is interposed between the bucket 465 and the arm 463 to extend and retract by being supplied with hydraulic oil and cause the bucket 465 to rotate around the horizontal axis with respect to the arm 463.

Figure 16:
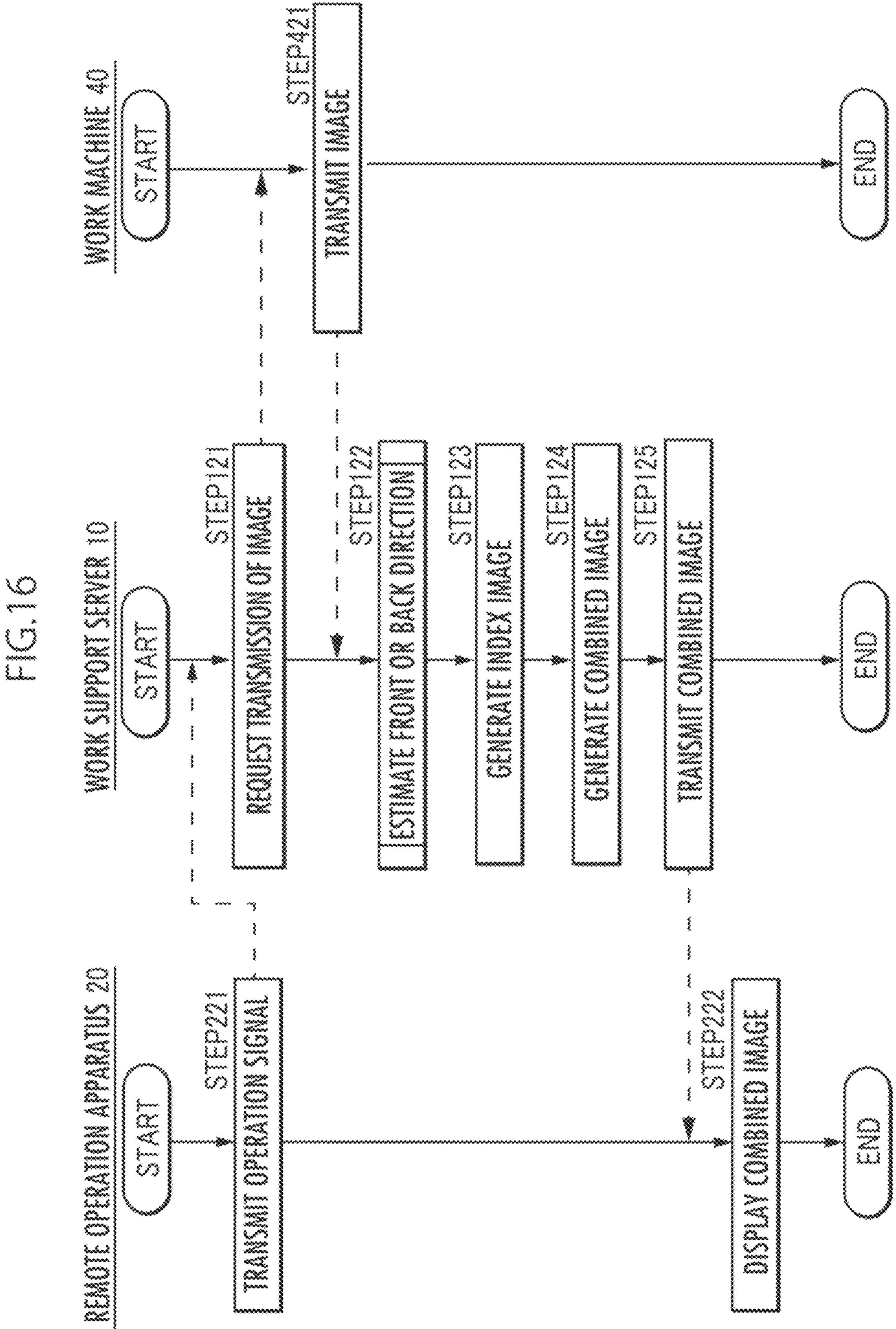
FIG. 16 is a flowchart illustrating an example of work support processing by a work support server.

FIG. 16 is a flowchart illustrating work support processing of the work support system that is attained by cooperating the work support server 10, the remote operation apparatus 20, and the work machine 40 described above.

The work support system is triggered by a start of the remote operation apparatus 20 to begin the work support processing. When an operator turns of for example, the cutoff lever 2113, the remote operation apparatus 20 transmits an operation signal to the work support server 10 (STEP 221).

Once receiving the operation signal, the work support server 10 requests the transmission of images from the work machine 40 that is an operation target of the remote operation apparatus 20 (STEP 121).

Once receiving an image transmission request, the work machine 40 transmits images (fourth captured images and a fifth captured image) taken by the fourth imaging devices 412*d* and 412*e* and the fifth imaging device 412*f* to the work support server 10 (STEP 421).

Once receiving the images (the fourth captured images and the fifth captured image) taken by the fourth imaging devices 412*d* and 412*e* and the fifth imaging device 412*f* the first support processing element 1011 of the work support server 10 recognizes the forward direction or the backward direction of the lower traveling body 430 (front or back direction estimating processing) based on the respective modes of the appearances of the first markers M1 and the second markers M2 in the fourth captured images taken by the fourth imaging devices 412*d* and 412*e* (STEP 122). The first markers M1 and the second markers M2 are unevenly disposed in the front or back directions of the pair of respective crawlers 430*a* and 430*b*. The first markers M1 and the second markers M2 have forms different from each other. The first markers M1 are provided at the fronts of the pair of crawlers. The second markers M2 are provided at the backs of the pair of crawlers 430*a* and 430*b*.

The first support processing element 1012 generates an index image indicating the forward direction or the backward direction of the lower traveling body 430 recognized by the first support processing element 1011 (STEP 123).

In addition, the first support processing element 1012 generates a combined image in which the index image is superimposed at least partially on the work machine 40 or the region therearound in each of the fourth captured images (STEP 124) and transmits the generated combined image to the remote operation apparatus 20 (STEP 125).

For example, the first support processing element 1012 generates a combined image in which the index image I1 is superimposed on the fourth captured image (also referred to as a foot image below) in any of FIGS. 18B to 10B taken by the foot camera 412*d*. In addition, the fast support processing element 1012 generates a combined image in which, for example, the index image I1 is superimposed on the fourth captured image (also referred to as a left image below) in FIG. 22C taken by the left camera 412*e*. Further, the first support processing element 1012 generates a combined image in which the index image 2 is superimposed on the fifth captured image (also referred to as a main image below) in any of FIGS. 18C to 9C and 22D taken by the main camera 412*f*.

That is, the first support processing element 1012 generates a combined image in which the index images I1 and I2 are superimposed at least partially on the work machine 40 or the region therearound in at least one captured image among the fourth captured images (the foot image and the left image) and the main image at the angle corresponding to the revolution angle of the upper revolving body 450 with respect to the lower traveling body 430 recognized by the first support processing element 1011.

Specifically, the first support processing element 1011 recognizes the revolution angle of the upper revolving body 450 with respect to the lower traveling body 430 based on the inclination angles or the like of the left and right crawlers 430*a* and 430*b* with respect to the imaging directions of the fourth imaging devices (the foot camera and the left camera) 412*d* and 412*e* and which of the first markers M1 and the second markers M2 appear in the fourth captured images (the foot image and the left image). It is possible for a second support processing element to generate a combined image by superimposing the index images I1 and I2, for example, in accordance with the inclination angles of the left and right crawlers 430*a* and 430*b* with respect to the imaging directions of the fourth imaging devices (the foot camera and the left camera) 412*d* and 412*e*.

The remote operation apparatus 20 displays a received combined image, for example, on the middle remote image output device 2210 (STEP 222). It is to be noted that the combined image may be displayed on an image output device other than the middle remote image output device 2210. For example, the combined image may also be displayed on an image output device such as the left remote image output device 2211 or the right remote image output device 2212.

The front or back direction estimating processing of STEP 122 will be described of estimating the forward direction or the backward direction of the lower traveling body 430 based on the mode of the appearance of the first marker or the second marker in a fourth captured image.

Figure 17:
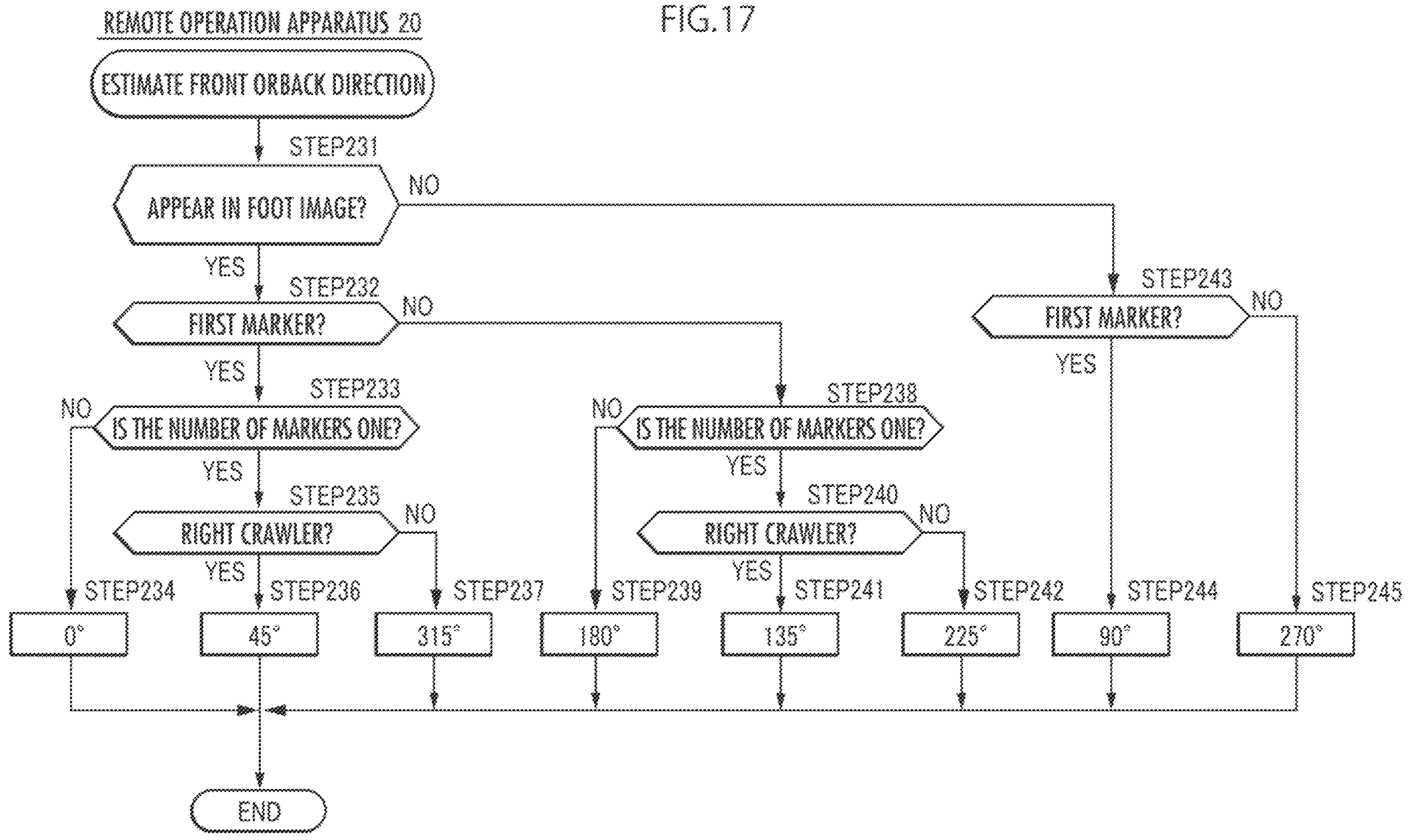
FIG. 17 is a flowchart illustrating an example of processing of calculating a forward or backward direction in FIG. 16.

As illustrated in FIG. 17, the first support processing element 1011 determines whether or not the first marker M1 or the second marker M2 appears in the foot image (STEP 231).

The determination in STEP 231 is made, for example, with reference to image data (design data) of the first marker M1 and image data (design data) of the second marker M2 recorded in the database 110 in advance based on whether or not the foot image includes a design that matches the image data (design data) of the first marker M1 or the image data (design data) of the second marker M2.

Specifically, the first support processing element 1011 corrects the design of the first marker M1 (or the design of the second marker M2) appearing in the foot image by using the aspect ratio and then calculates the degree of similarity to the image data of the first marker M1 (or the second marker M2) recorded in the database 110. When the degree of similarity is higher than or equal to a predetermined value, the first support processing element 1011 determines that the first marker M1 (or the second marker M2) is included in the foot image.

The determination in STEP 231 is not limited to such a determination technique. For example, the plurality of pieces of image data of the first marker M1 and the second marker M2 in the foot image and the plurality of pieces of image data of the first marker M1 and the second marker M2 in the left image which correspond to the angle of the upper revolving body 450 with respect to the lower traveling body 430 are recorded in the database 110 in advance. The first support processing element 1011 may determine whether or not the first marker M1 and the second marker M2 are included in the foot image or the left image by comparing the plurality of pieces of image data and the pieces of image data of the foot image and the left image which is transmitted from the work machine 40.

When determining in the determination in STEP 231 that the first marker M1 or the second marker M2 appears in the foot image (STEP 231: YES), the first support processing element 1011 determines whether or not the marker is the first marker M1 (STEP 232).

The determination in STEP 232 is made, for example, based on an image that is determined by the first support processing element 1011 as a matching image in the determination in STEP 231.

When determining in the determination in STEP 232 that the marker appearing in the foot image is the first marker M1 (STEP 232: YES), the first support processing element 1011 determines whether or not the number of first markers M1 appearing in the foot image is one (STEP 233).

The determination in STEP 233 is made, for example, based on the number of images that are determined by the first support processing element 1011 as matching images in the determination in STEP 231.

When determining that the number of first markers M1 appearing in the foot image is not one (STEP 233: NO), the first support processing element 1011 recognizes that the upper revolving body 450 has a revolution angle of 0±α° with respect to the lower traveling body 430 (STEP 234). In other words, the first support processing element 1011 determines that the front direction in which the front window of the cab 454 is provided matches the forward direction of the lower traveling body 430.

Here, a is a range of an angle at which the two first markers M1 appear in the foot image with 0° as the center. It is possible to set the angle α as appropriate in accordance with the field of view of a lens (such as a wide angle lens or a fish-eye lens) used for the fourth imaging device 412*d*, a separation distance between the pair of crawlers 430*a* and 430*b* of the lower traveling body 430, and the like. It is to be noted that the first support processing element 1011 recognizes a direction opposite to the forward direction as the backward direction of the lower traveling body 430.

For example, when the forward direction of the lower traveling body 430 of the work machine 40 matches the front direction of the upper revolving body 450 as illustrated in FIG. 18A, the pair of left and right crawlers 430*a* and 430*b* and the two first markers M1 provided to the respective crawlers 430*a* and 430*b* appear in the foot image illustrated in FIG. 18B. The first support processing element 1011 thus determines that the front direction in which the front window of the cab 454 is provided matches the forward direction of the lower traveling body 430 in such a case where the two first markers M1 appear in the foot image. As described for the combined-image generation processing of STEP 124 above, the first support processing element 1012 superimposes the index images I1 each having the corresponding angle on the foot image as illustrated in FIG. 18B and superimposes the index image I2 on the main image as illustrated in FIG. 18C.

That is, the first support processing element 1011 recognizes the revolution angle of the upper revolving body 450 with respect to the lower traveling body 430 which is based on the modes of the appearances of the pair of crawlers 430*a* and 430*b* in the foot image which change in accordance with a revolution of the upper revolving body 450 with respect to the lower traveling body 430 and the respective modes of the appearances of the first marker M1 and the second marker M2 in the foot image. It is to be noted that the first support processing element 1011 may recognize the revolution angle with reference to revolution data obtained by the revolution angle sensor of the actual machine state sensor group 414.

When determining that the number of first markers appearing in the foot image is one (STEP 233: YES), the first support processing element 1011 determines whether or not the crawler to which the first marker appearing in the foot image is attached is the right crawler 430*a* (STEP 235).

For example, the first support processing element 1011 causes the database 110 to record, in advance, the plurality of pieces of image data of the right crawler 430*a* and the left crawler 430*b* in the foot image which corresponds to the angle of the upper revolving body 450 with respect to the lower traveling body 430 and the plurality of pieces of image data of the right crawler 430*a* and the left crawler 430*b* in the left image which corresponds to the angle of the upper revolving body 450 with respect to the lower traveling body 430. The first support processing element 1011 determines whether or not the right crawler 430*a* is included in the foot image or the left image by comparing the plurality of pieces of image data and the pieces of image data of the foot image and the left image which are transmitted from the work machine 40.

When determining that the crawler appearing in the foot image is the right crawler 430*a* (STEP 235: YES), the first support processing element 1011 recognizes that the upper revolving body 450 has a revolution angle of 45±α° with respect to the lower traveling body 430 (STEP 236). In other words, the first support processing element 1011 determines that the front direction of the cab 454 forms an angle of 45±α° with respect to the forward direction of the lower traveling body 430. That is, the first support processing element 1011 recognizes a direction of 45° with respect to the front direction of the cab 454 as the forward direction of the lower traveling body 430.

Figure 19:
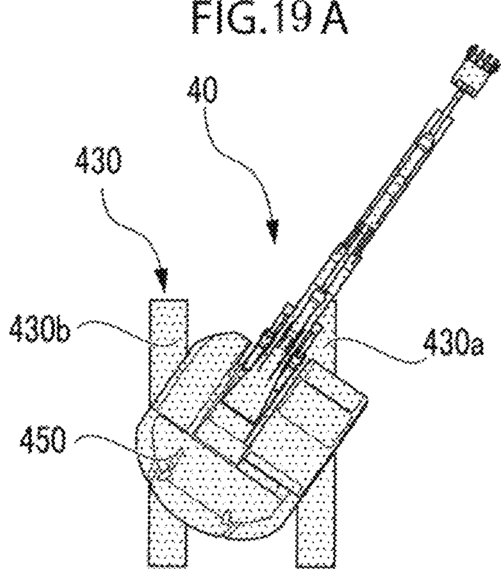
FIG. 19A, FIG. 19B, and FIG. 19C are explanatory diagrams illustrating an example of the image taken by the imaging device.
Figure 19:
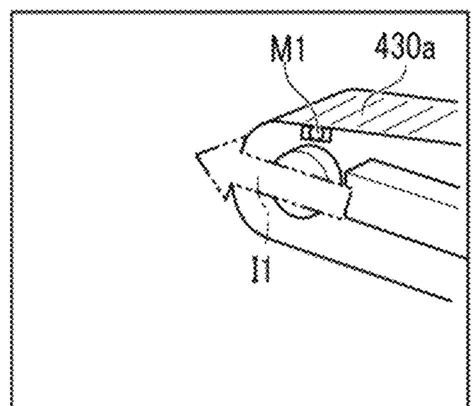
Figure 19:
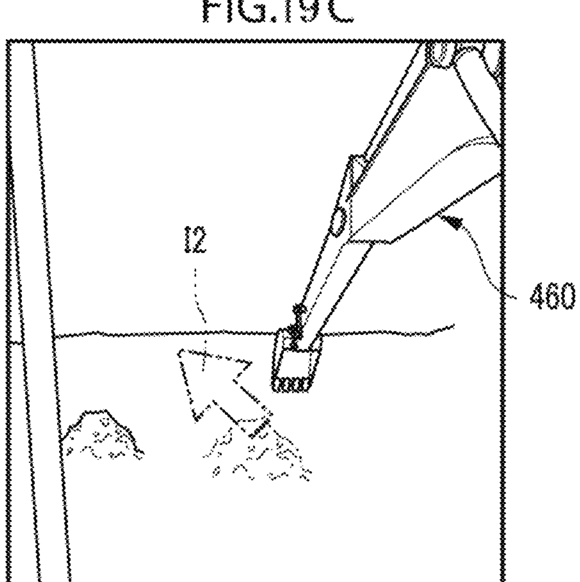

For example, when the front direction of the upper revolving body 450 forms an angle of 45±α° with respect to the forward direction of the lower traveling body 430 as illustrated in FIG. 19A, for example, the right crawler 430*a* and the one first marker M1 provided to the right crawler 430*a* appear in the foot image illustrated in FIG. 19B. The first support processing element 1011 thus determines that the front direction in which the front window of the cab 454 is provided forms an angle of 45±α° with respect to the forward direction of the lower traveling body 430 in such a case where the right crawler 430*a* and the one first marker M1 appear in the foot image. As described for the combined-image generation processing of STEP 124 above, the first support processing element 1012 superimposes the index images I1 each having the corresponding angle on the foot image as illustrated in FIG. 19B and superimposes the index image I2 on the main image as illustrated in FIG. 19C.

When determining that the crawler appearing in the foot image is the left crawler 430*b* (STEP 235: NO), the first support processing element 1011 recognizes that the upper revolving body 450 has a revolution angle of 315±α° with respect to the lower traveling body 430 (STEP 237). In other words, the first support processing element 1011 determines that the front direction of the cab 454 forms an angle of 315±α° with respect to the forward direction of the lower traveling body 430. That is, the first support processing element 1011 recognizes a direction of 315±α° with respect to the front direction of the cab 454 as the forward direction of the lower traveling body 430.

Figure 20:
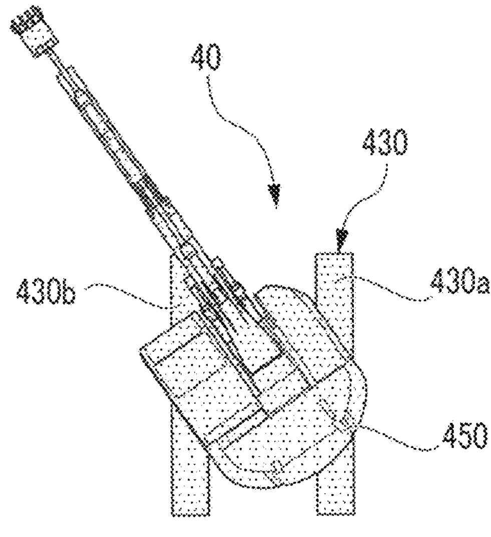
FIG. 20A, FIG. 20B, and FIG. 20C are explanatory diagrams illustrating an example of the image taken by the imaging device.
Figure 20B:
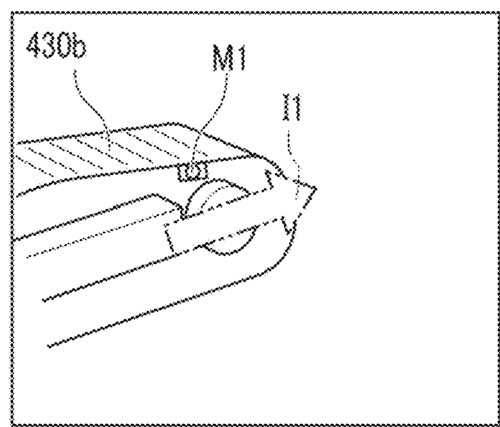
Figure 20:
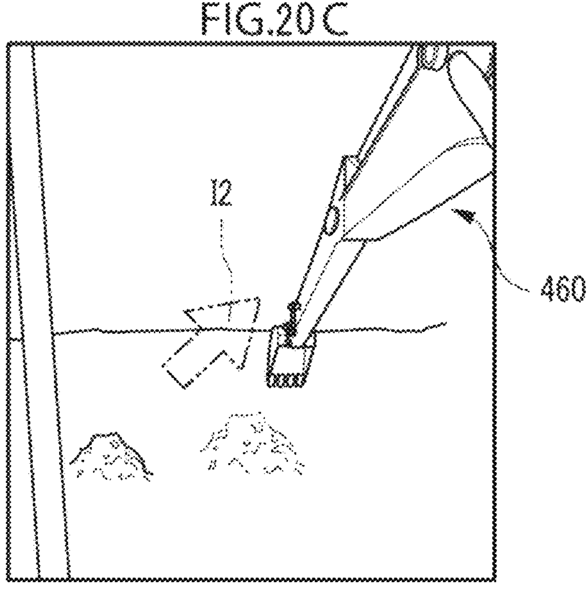

For example, when the front direction of the upper revolving body 450 forms an angle of 315±α° with respect to the forward direction of the lower traveling body 430 as illustrated in FIG. 20A, for example, the left crawler 430*b* and the one first marker M1 provided to the left crawler 430*b* appear in the foot image illustrated in FIG. 20B. The first support processing element 1011 thus determines that the front direction in which the front window of the cab 454 is provided forms an angle of 315° with respect to the forward direction of the lower traveling body 430 in such a case where the left crawler 430*b* and the one first marker M1 appear in the foot image. As described for the combined-image generation processing of STEP 124 above, the first support processing element 1012 superimposes the index images I1 each having the corresponding angle on the foot image as illustrated in FIG. 20B and superimposes the index image 2 on the main image as illustrated in FIG. 20C.

When determining in the determination in STEP 232 that the marker appearing in the foot image is the second marker M2 (STEP 232: NO), the first support processing element

1011 determines whether or not the number of second markers M2 appearing in the foot image is one (STEP 238).

When determining that the number of second markers M2 appearing in the foot image is not one (STEP 238: NO), the first support processing element 1011 recognizes that the upper revolving body 450 has a revolution angle of 180±α° with respect to the lower traveling body 430 (STEP 239). In other words, the first support processing element 1011 determines a relationship in which the front direction in which the front window of the cab 454 is provided is opposite to the forward direction of the lower traveling body 430.

When determining that the number of second markers M2 appearing in the foot image is one (STEP 238: YES), the first support processing element 1011 determines whether or not the crawler to which the second marker M2 appearing in the foot image is attached is the right crawler 430*a* (STEP 240).

When determining that the crawler appearing in the foot image is the right crawler 430*a* (STEP 240: YES), the first support processing element 1011 recognizes that the upper revolving body 450 has a revolution angle of 135±α° with respect to the lower traveling body 430 (STEP 241). In other words, the first support processing element 1011 determines that the front direction of the cab 454 forms an angle of 135±α° with respect to the forward direction of the lower traveling body 430. That is, the first support processing element 1011 recognizes a direction of 135±α° with respect to the front direction of the cab 454 as the forward direction of the lower traveling body 430.

When determining that the crawler appearing in the foot image is the left crawler 430*b* (STEP 240: NO), the first support processing element 1011 recognizes that the upper revolving body 450 has a revolution angle of 225±α° with respect to the lower traveling body 430 (STEP 242). In other words, the first support processing element 1011 determines that the front direction of the cab 454 forms an angle of 225±α° with respect to the forward direction of the lower traveling body 430. That is, the first support processing element 1011 recognizes a direction of 225±α° with respect to the front direction of the cab 454 as the forward direction of the lower traveling body 430.

For example, when the front direction of the upper revolving body 450 forms an angle of 225±α° with respect to the forward direction of the lower traveling body 430 as illustrated in FIG. 21A, for example, the left crawler 430*b* and the one second marker M2 provided to the left crawler 430*b* appear in the foot image illustrated in FIG. 21B. The first support processing element 1011 thus determines that the front direction in which the front window of the cab 454 is provided forms an angle of 225±α° with respect to the forward direction of the lower traveling body 430 in such a case where the left crawler 430*b* and the one second marker M2 appear in the foot image. As described for the combined-image generation processing of STEP 124 above, the first support processing element 1012 superimposes the index images I1 each having the corresponding angle on the foot image as illustrated in FIG. 21B and superimposes the index image I2 on the main image as illustrated in FIG. 21C.

When it is determined in the determination in STEP 231 that the first marker M1 or the second marker M2 does not appear in the foot image (STEP 231: NO), the first marker M1 or the second marker M2 appears in either the foot image or the left image as described above and the first support processing element 1011 thus refers to the left image to determine whether or not the marker appearing in the left image is the first marker M1 (STEP 243).

When determining that the marker appearing in the left image is the first marker M1 (STEP 243: YES), the first support processing element 1011 recognizes that the upper revolving body 450 has a revolution angle of 90±α° with respect to the lower traveling body 430 (STEP 244). In other words, the first support processing element 1011 determines that the front direction of the cab 454 forms an angle of 90±α° with respect to the forward direction of the lower traveling body 430. That is, the first support processing element 1011 recognizes a direction of 90±α° with respect to the front direction of the cab 454 as the forward direction of the lower traveling body 430.

When determining that the marker appearing in the left image is the second marker M2 (STEP 243: NO), the first support processing element 1011 recognizes that the upper revolving body 450 has a revolution angle of 270±α° with respect to the lower traveling body 430 (STEP 245). In other words, the first support processing element 1011 determines that the front direction of the cab 454 forms an angle of 270±α° with respect to the forward direction of the lower traveling body 430. That is, the first support processing element 1011 recognizes a direction of 270±α° with respect to the front direction of the cab 454 as the forward direction of the lower traveling body 430.

For example, when the front direction of the upper revolving body 450 forms an angle of 270±α° with respect to the forward direction of the lower traveling body 430 as illustrated in FIG. 22A, for example, the left crawler 430*b* alone appears in the foot image illustrated in FIG. 22B. The first support processing element 1011 thus refers to the left image illustrated in FIG. 22C to recognize, for example, that the pair of left and right crawlers 430*a* and 430*b* and the two first markers M1 provided to the respective crawlers 430*a* and 430*b* appear therein. The first support processing element 1011 thus determines that the front direction in which the front window of the cab 454 is provided has an angle of 270±α° with respect to the forward direction of the lower traveling body 430 in such a case where the two first markers M1 appear in the left image. As described for the combined-image generation processing of STEP 124 above, the first support processing element 1012 superimposes the index images I1 each having the corresponding angle on the left image as illustrated in FIG. 22C and superimposes the index image I2 on the main image as illustrated in FIG. 22D.

The first support processing element 1011 thus recognizes the forward direction or the backward direction of the lower traveling body 430 based on the respective modes of the appearances of the first markers M1 and the second markers M2 in the plurality of fourth captured images (the foot image and the left image) obtained through the plurality of fourth imaging devices 412*d* and 412*e*.

In the description above, the types of the first marker M1 and the second marker M2 appearing in the foot image and the left image, and the number of first markers M1 and the number of second markers M2 appearing in the foot image and the left image are individually determined in STEPS 231 to 213, STEP 238, and STEP 243. These determinations may be, however, made in one step through the image processing described above.

In addition, in the description above, it is taken into consideration which of the crawlers 430*a* and 430*b* appears in the fourth captured images (the foot image and the left image) and the revolution angle of the upper revolving body 450 with respect to the lower traveling body 430 is then recognized, but this is not limitative.

For example, the first support processing element 1011 may recognize the revolution angle of the upper revolving body 450 with respect to the lower traveling body 430 based on which of the first marker M1 and the second marker M2 appears in the fourth captured images (the foot image and the left image), and the number of first markers M1 and the number of second markers M2 appearing in the fourth captured images (the foot image and the left image).

Specifically, the first support processing element 1011 recognizes which of the first marker M1 and the second marker is a marker appearing in each of the fourth captured images and recognizes the number of recognized first markers M1 or second markers appearing in the fourth captured images.

For example, when the front direction of the cab 454 matches the forward direction of the lower traveling body 430 at an angle of 0±α° and the two first markers M1 or the two second markers M2 appear in the fourth captured image (foot image), the first support processing element 1011 recognizes that the revolution angle of the upper revolving body 450 with respect to the lower traveling body 430 is a specific angle that is, for example, an angle (0±α° or 180±α°) close to 0° or 180°.

In addition, for example, when the one first marker M1 or the one second marker M2 appears in the fourth captured image (foot image), the first support processing element 1011 recognizes that the revolution angle of the upper revolving body 450 with respect to the lower traveling body 430 is a specific angle that is, for example, an angle (45±α° or 135±α°) close to 45° or 135°.

Further, it is possible for the first support processing element 1011 to recognize the front or back direction of the pair of crawlers 430*a* and 430*b* in accordance with which marker (the first marker M1 or the second marker M2) appears in the fourth captured image (foot image). Still further, when the first marker M1 and the second marker M2 do not appear in the fourth captured image (foot image), it is recognized that the revolution angle of the upper revolving body 450 with respect to the lower traveling body 430 is a specific angle that is, for example, an angle (90±α°) close to 90°. It is thus possible to recognize the revolution angle of the upper revolving body 450 with respect to the lower traveling body 430 and the front or back direction of the pair of crawlers 430*a* and 430*b* without using the modes of the appearances of the pair of crawlers 430*a* and 430*b* in the fourth captured images (the foot image and the left image). This eliminates the necessity of image analysis processing necessary for the modes of the appearances of the pair of crawlers 430*a* and 430*b* and makes it possible to reduce the processing load of the first support processing element 1012.

In addition, the first support processing element 1011 may recognize the revolution angle of the upper revolving body 450 with respect to the lower traveling body 430 which is based on the positions of the first marker M1 and the second marker M2 in the left or right direction in the fourth captured images (the foot image and the left image) which serve as the modes of the appearances of the first marker M1 and the second marker M2 included in the fourth captured images (the foot image and the left image).

According to such an aspect, for example, when the front direction of the cab 454 matches the forward direction of the lower traveling body 430 at an angle of 0°, and one of the two first markers M1 (or the two second markers M2) is positioned closer to the right end from the middle of any of the fourth captured images (the foot image and the left image) and the other first marker M1 (or the second marker) is positioned closer to the left end from the middle of the fourth captured image (foot image), the fast support processing element 1011 recognizes that the angle of the upper revolving body 450 with respect to the lower traveling body 430 is a specific angle that is, for example, an angle (0±α° or 180±α°) close to 0° or 180°.

It is to be noted that the first support processing element 1011 may make a more detailed angle determination, for example, at the position of the midpoint of a line that connects the first markers M1. For example, when the upper revolving body 450 has an angle of 3° with respect to the lower traveling body 430, the position of the midpoint of a line that connects the first markers M1 is closer to the right of the foot image among the left and right directions than when the angle is 0°. A plurality of positions that corresponds to the various angles like this is recorded for the midpoint of a line that connects the first markers M1 in the database 110 as pieces of image data. The first support processing element 1011 may refer to a position of a midpoint to calculate how much the position of the midpoint matches the position of a midpoint in the foot image and make the detailed angle determination.

In addition, for example, % Wen the first marker M1 of the right crawler 430*a* is positioned near the middle between the left and right directions in the fourth captured image (foot image), it is recognized that the revolution angle of the upper revolving body 450 with respect to the lower traveling body 430 is a specific angle that is, for example, an angle (45±α°) close to 45°. In addition, for example, when the first marker M1 of the left crawler 430*b* is positioned near the middle between the left and right directions in the fourth captured image (foot image), it is recognized that the revolution angle of the upper revolving body 450 with respect to the lower traveling body 430 is a specific angle that is, for example, an angle (135±α°) close to 135°.

In this way, the modes of the appearances of the fast marker M1 and the second marker M2 included in the fourth captured image change in accordance with the revolution angle of the upper revolving body 450 with respect to the lower traveling body 430. Specifically, the positions of the first marker M1 and the second marker M2 in the left or right direction in the fourth captured image change in accordance with the change in the revolution angle. This allows the first support processing element 1011 to recognize the revolution angle of the upper revolving body 450 with respect to the lower traveling body 430 by recognizing the positions of the first marker M1 and the second marker M2 in the left or right direction in the fourth captured image (foot image).

It is favorable that the first support processing element 1012 display or hide a combined image based on a predetermined timing. The following describes control by the first support processing element 1012 to display or hide a combined image.

Figure 23:
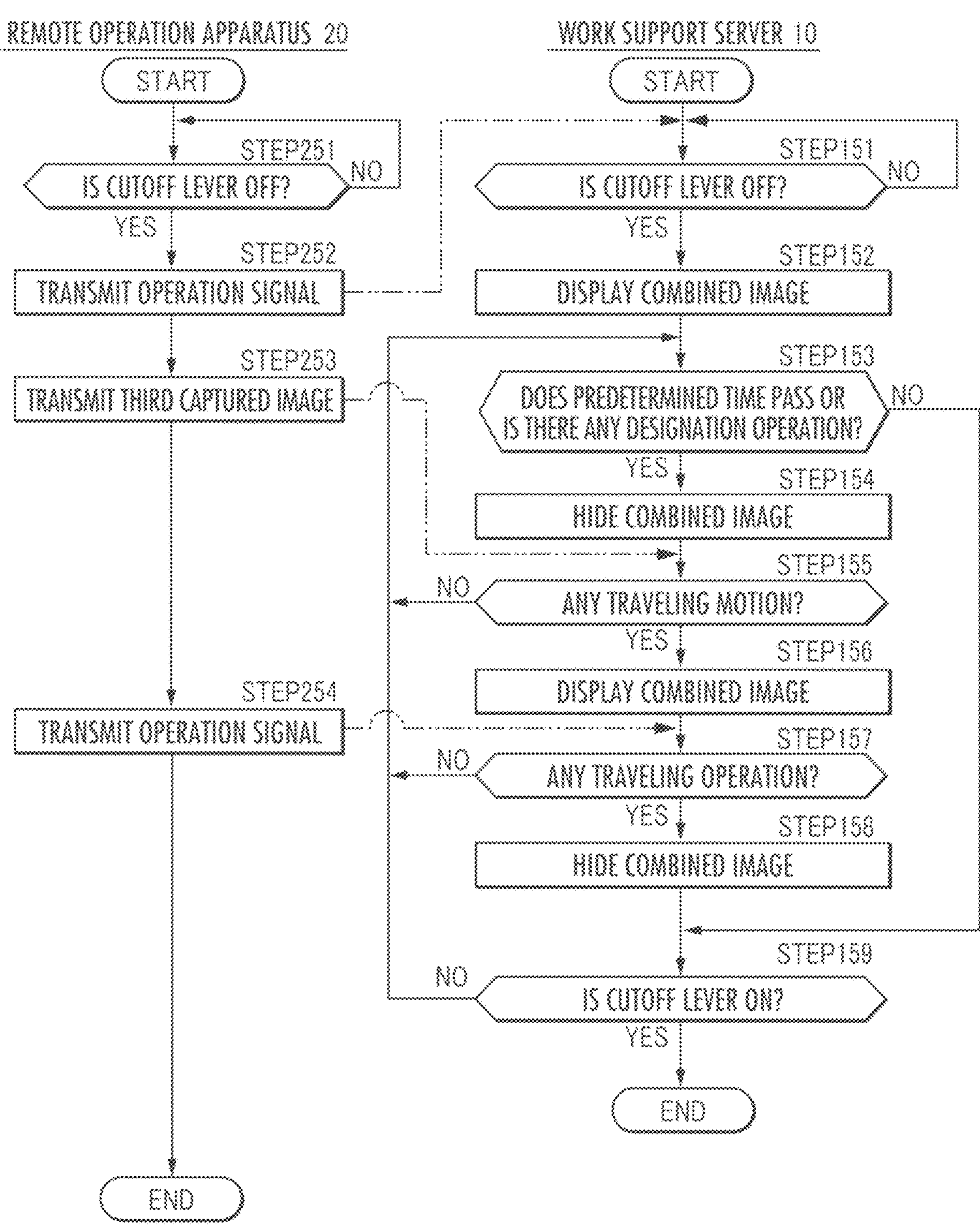
FIG. 23 is a flowchart illustrating another example of the work support processing by the work support server.

As illustrated in FIG. 23, the remote operation apparatus 20 is triggered by a start of the remote operation apparatus 20 to begin the work support processing. When the operator OP1 turns off, for example, the cutoff lever 2113 (STEP 251: YES), the remote operation apparatus 20 transmits an operation signal to the work support server 10 (STEP 252).

Once receiving the operation signal, the first support processing element 1011 of the work support server 10 recognizes that the cutoff lever 2113 is turned off (STEP 151: YES) and the first support processing element 1011 and the first support processing element 1012 perform display processing for a combined image (STEP 152).

The first support processing element 1011 thus obtains, as an operation signal, operation acceptance information that is information indicating whether or not an operation on the work machine 40 is acceptable to the remote operation apparatus 20. In the display processing of STEP 152, the frit or back direction estimating processing of STEP 122 to the combined-image transmission processing of STEP 125 are performed. The first support processing element 1012 thus transmits the combined image to the remote operation apparatus 20 when the operation acceptance information indicates that an operation on the work machine 40 is acceptable.

The first support processing element 1011 of the work support server 10 determines whether a predetermined time (e.g., 60 seconds) passes after the display processing of the combined image is performed in STEP 152 or a designation operation (e.g., an operation on the boom operation device, the arm operation device, or the bucket operation device, or a traveling motion described below) designated in advance is performed (STEP 153).

When the first support processing element 1011 of the work support server 10 determines in the determination in STEP 153 that the predetermined time passes after the display processing of the combined image is performed or the designation operation designated in advance is performed (STEP 153: YES), the first support processing element 1011 and the first support processing element 1012 perform hiding processing of the combined image (STEP 154). That is, the first support processing element 1011 and the first support processing element 1012 stop the combined-image generation processing of STEP 124 and the combined-image transmission processing of STEP 125.

When determining in the determination in STEP 153 that the predetermined time does not pass after the display processing of the combined image is performed or the designation operation designated in advance is not performed (STEP 153: NO), the first support processing element 1011 of the work support server 10 proceeds to a determination in STEP 159 described below.

The remote operation apparatus 20 transmits an operation signal to the work support server 10 in STEP 252 and then transmits a sixth captured image taken by the sixth imaging device 212 to the work support server 10 (STEP 253).

The first support processing element 1011 of the work support server 10 refers to the obtained sixth captured image after the hiding processing of the combined image is performed in STEP 154 and determines whether or not the operator OP1 makes a traveling motion that is an action for causing the work machine 40 to travel (STEP 155).

The traveling motion is an action of the operator OP1 for operating the traveling operation device of the remote operation mechanism 211. Examples of the traveling motion include actions for operating an operation lever (travel lever) of the traveling operation device and operating a travel pedal.

The determination in STEP 155 is made, for example, by the transition of a state between the operator OP1 and the travel lever 2110 from a non-interaction state to an interaction state. Here, the non-interaction state is, for example, a state in which the operator OP1 is not gripping or touching the travel lever 2110. In addition, the interaction state is, for example, a state in which the operator OP1 is gripping or touching the travel lever 2110. A state in which the operator OP1 does not have afoot positioned on the travel pedal may be adopted as the non-interaction state and a state in which the operator OP1 has a foot positioned on the travel pedal may be adopted as the interaction state. This makes it possible to determine whether or not the traveling motion is made at an operation initial stage where the lower traveling body 430 has not yet begun the operation in a situation in which it is highly probable that the operator OP1 intends to bring the lower traveling body 430 into operation.

The first support processing element 1011 thus obtains, as the traveling motion, traveling operation information for a preparation action that is an action representing an intention of an operation input for moving forward or moving backward the work machine 40 in the remote operation apparatus 20.

When determining in the determination in STEP 155 that the operator OP1 does not make the traveling motion which is an action for causing the work machine 40 to travel (STEP 155: NO), the first support processing element 1011 returns to the determination in STEP 153.

When determining in the determination in STEP 155 that the operator OP1 makes the traveling motion which is an action for causing the work machine 40 to travel (STEP 155: YES), the first support processing element 1011 determines a type such as a forward operation or a backward operation, generates a combined image by aligning an index image with the forward direction or the backward direction, and performs display processing of the combined image (STEP 156). In the display processing of the combined image in STEP 156, the same processing is performed as the display processing of the combined image in STEP 152.

The first support processing element 1012 thus transmits, to the remote operation apparatus 20, a combined image generated by using an index image indicating the forward direction of the lower traveling body 430 when the intention represented by the preparation action is an operation input for moving forward. The first support processing element 1012 also transmits, to the remote operation apparatus 20, a combined image generated by using an index image indicating the backward direction of the lower traveling body 430 when the intention represented by the preparation action is an operation input for moving backward.

The remote operation apparatus 20 transmits the sixth captured image to the work support server 10 in STEP 253 and then transmits, to the work support server 10, an operation signal corresponding to an operation of the operator OP1 for bringing the work machine 40 into operation (STEP 254).

The first support processing element 1011 determines whether or not a traveling operation is performed based on the operation signal transmitted from the remote operation apparatus 20 (STEP 157). The first support processing element 1011 makes the determination in STEP 157, for example, based on whether or not the operation signal includes a signal related to the traveling operation.

When determining in the determination in STEP 157 that the traveling operation is not performed (STEP 157: NO), the first support processing element 1011 returns to the determination in STEP 153.

When the first support processing element 1011 determines in the determination in STEP 157 that the traveling operation is performed (STEP 157: YES), the first support processing element 1011 and the first support processing element 1012 perform hiding processing of the combined image (STEP 158). In the hiding processing of the combined image in STEP 158, the same processing is performed as the processing of STEP 154.

The first support processing element 1011 determines whether the cutoff lever 2113 is on (STEP 159).

When determining in the determination in STEP 159 that the cutoff lever 2113 is on (STEP 159: YES), the first support processing element 1011 ends the processing.

When determining in the determination in STEP 159 that the cutoff lever 2113 is off (STEP 159: NO), the first support processing element 1011 returns to the determination in STEP 153.

In the description of the second embodiment above, it has been described that the work support processing is executed by the work support server 10. The work support processing may be, however, performed by the remote operation apparatus 20 or the work machine 40.

In addition, it has been described in the second embodiment above that the first support processing element 1011 and the first support processing element 1012 are processing elements different from each other, but the respective support processing elements may also be processed by one "support processing element".

In addition, it has been described in the second embodiment above that it is determined with reference to the sixth captured image obtained by the sixth imaging device 212 whether or not the operator OP1 makes the traveling motion, but this is not limitative. For example, a grip sensor which detects that an operator grips the travel lever 2110 may be disposed at a portion of the travel lever 2110 to be gripped by the operator OP1 and the first support processing element 1011 may determine whether or not the traveling motion is made by obtaining the detection by the grip sensor. The grip sensor may include, for example, a sensor electrode disposed at the travel lever 2110 and a measurement unit that measures an electrostatic capacitance value between the grip sensor and a human body (operator OP1) or may include a measurement unit such as a piezoelectric element that measures pressure occurring when the operator OP1 touches the travel lever 2110.

In the second embodiment described above, the processing of hiding a combined image (STEP 154) is performed when it is determined that the designation operation is performed (STEP 153: YES). It is not, however, necessary to immediately execute STEP 154. For example, even when it is determined that the designation operation is performed or the traveling motion is made (STEP 153: YES). STEP 154 may be executed a predetermined time (e.g., 60 seconds) after the display processing of the combined image is performed in STEP 152. It is possible to set any time as the predetermined time in this case. A time shorter than 60 seconds may be set. This allows the operator OP1 to reliably recognize the forward direction or the backward direction of the lower traveling body 430.

In the second embodiment described above, the hiding processing of the combined image is performed (STEP 158) when it is determined that the traveling operation is performed (STEP 157: YES). The processing of STEP 158 is, however, executed optionally. For example, the display processing of the combined image may be continued while the traveling operation is being performed.

In the second embodiment described above, an index image is superimposed on each of the fourth captured images (the foot image and the left image). However, the index image does not necessarily have to be superimposed on each of the fourth captured images (the foot image and the left image). For example, the index image may be superimposed on the fifth captured image (main image) alone. In other words, the first support processing element 1012 may transmit, to the remote operation apparatus 20, a combined image in which the index image indicating the forward direction or the backward direction of the lower traveling body 430 recognized by the first support processing element 1011 is superimposed at least partially on the work machine 40 or the region therearound in the fifth captured image obtained through the fifth imaging device 412*f* provided to the lower traveling body 430 in addition to the fourth imaging devices 412*d* and 412*e*.

In the remote operation system according to the present invention, it is preferable that the support processing element superimpose the index image at least partially on the work machine or the region around the work machine in the captured image at an angle corresponding to the revolution angle of the upper revolving body with respect to the lower traveling body based on the mode of the appearance of the lower traveling body and the mode of the appearance of the designated component which change in accordance with a revolution of the upper revolving body with respect to the lower traveling body.

According to such an aspect, it is possible for the support processing element to recognize the revolution angle of the upper revolving body with respect to the lower traveling body, for example, based on the mode of the appearance of the lower traveling body in a captured image, which (one or both of) of the left and the right of the lower traveling body appears in the captured image, the left and right inclination angles or the like of the lower traveling body with respect to the imaging direction of an imaging device, and which of the plurality of designated components appears in the captured image. For example, it is thus possible for the support processing element to generate a combined image by superimposing an index image in accordance with the left and right inclination angles of the lower traveling body with respect to the imaging direction of the imaging device and transmit the combined image to the remote operation apparatus. This allows the operator to easily recognize the forward direction or the backward direction of the lower traveling body by simply observing the combined image visually.

In the remote operation system according to the present invention, it is preferable that a plurality of the imaging devices be disposed at positions whose directions are different from each other as viewed from the work machine, and when the designated component of the lower traveling body does not appear in the one captured image obtained through the one imaging device, the support processing element superimpose an index image on the captured image. The index image is generated based on a mode of appearance of the lower traveling body and a mode of appearance of the designated component in the other captured image obtained through the other imaging device. The index image indicates the flout or back direction of the lower traveling body.

According to such an aspect, even when the designated component of the lower traveling body of the work machine does not appear in the one captured image, it is possible for the support processing element to transmit, to the remote operation apparatus, the combined image in which the index image indicating the front or back direction of the lower traveling body of the work machine is superimposed based on the other captured image.

In addition, in the remote operation system according to the present invention, it is preferable that the support processing element recognize a revolution angle of the upper revolving body with respect to the lower traveling body. The revolution angle is based on a position of the designated component in a left or right direction in the one captured image. The position serves as the mode of the appearance of the designated component included in the one captured image.

According to such as aspect, the modes of the appearances of the plurality of designated components included in the one captured image change in accordance with the revolution angle of the upper revolving body with respect to the lower traveling body. Specifically, the positions of the plurality of designated components in the left or right direction in the one captured image change in accordance with the change in the revolution angle. This allows the support processing element to recognize the revolution angle of the upper revolving body with respect to the lower traveling body by recognizing the positions of the plurality of designated components in the left or right direction in the one captured image.

In addition, in the remote operation system according to the present invention, it is preferable that the first support processing element obtain the captured image including the designated component having a three-dimensional shape. The designated component is formed by protruding from the lower traveling body.

According to such an aspect, it is possible for the support processing element to easily recognize the plurality of designated components even when the plurality of designated components has dirt, mud, or the like.

In addition, in the remote operation system according to the present invention, it is preferable that the support processing element transmit, to the remote operation apparatus, the combined image in which the index image is superimposed on the one captured image based on image coordinates of the other captured image, a position at which the one imaging device is disposed, and a partial region of the one captured image.

According to such an aspect, it is possible for the support processing element to generate, for example, the combined image in which the index image is combined with the captured image taken from the one imaging direction (e.g., the front direction) of the work machine in which the designated component does not appear or the other imaging direction (e.g., the back direction). This allows the operator to recognize the front or back direction of the lower traveling body of the work machine without moving the line of sight.

In addition, in the remote operation system according to the present invention, it is preferable that the lower traveling body of the work machine include a pair of left and right crawlers, and the support processing element generate the index image in accordance with sizes of the crawlers in the combined image and positions of the crawlers in the combined image.

According to such an aspect, for example, it is possible for the support processing element to generate the combined image in which the index image is superimposed on the crawler and it is thus possible to increase the visual recognizability of the index image. This makes it possible to increase the work efficiency of the operator.

In addition, in the remote operation system according to the present invention, it is preferable that the support processing element obtain operation acceptance information that is information indicating whether or not an operation on the work machine is acceptable to the remote operation apparatus and transmit the combined image to the remote operation apparatus when the operation acceptance information indicates that the operation on the work machine is acceptable.

According to such an aspect, it is possible to display the forward direction or the backward direction of the lower traveling body only when the operator performs an operation on the work machine, which allows the operator to feel less bothered.

In addition, in the remote operation system according to the present invention, it is preferable that the support processing element obtain traveling operation information for a preparation action that is an action representing an intention of an operation input for moving forward or moving backward the work machine in the remote operation apparatus, transmit, to the remote operation apparatus, the combined image generated by using the index image indicating a forward direction of the lower traveling body when the intention represented by the preparation action is the operation input for moving forward, and transmit, to the remote operation apparatus, the combined image generated by using the index image indicating a backward direction of the lower traveling body when the intention represented by the preparation action is the operation input for moving backward.

According to such an aspect, it is possible to display the combined image in which the index image is superimposed only when the operator performs an operation of moving forward or moving backward the work machine and it is possible to reduce the degree of bothering caused by the constantly displayed combined image in which the index image is superimposed.

In addition, in the remote operation system according to the present invention, it is preferable that a plurality of the work machines be disposed close to each other, and the support processing element obtain positional information related to a position of the work machine that is a candidate for an operation target in a real space and recognize the work machine that is the candidate for the operation target as the work machine that is the operation target when the position of the work machine in the real space calculated from the captured image matches the positional information related to the position of the work machine that is the candidate for the operation target in the real space.

According to such an aspect, it is possible for the support processing element to distinguish the work machine that is the operation target even when the plurality of work machines is disposed close to each other. This allows the support processing element to distinguish the one work machine and generate the combined image for the work machine desired by the operator even when it is difficult to distinguish the one work machine that is the operation target from the plurality of work machines based on the external appearance.

REFERENCE SIGNS LIST

10 work support server
101 support processing element
1011 first support processing element
1012 second support processing element
20 remote operation apparatus
200 remote control device
210 remote input interface
211 remote operation mechanism
212 sixth imaging device
220 remote output interface
221 image output device
222 remote wireless communication device
40 work machine
400 actual machine control device
410 actual machine input interface
411 actual machine operating mechanism
**412*a*** actual machine imaging device
**412*b*** attachment imaging device
**412*c*** back imaging device
**412*d*, 412*e*** fourth imaging device
**412*f*** fifth imaging device
420 actual machine output interface

422 actual machine wireless communication device
460 actuation mechanism (work attachment)
430 lower traveling body
430*a*, 430*b* crawler
431 drive member
440 revolving mechanism
450 upper revolving body
454 cab (operator's room)
460 actuation mechanism
50 first imaging device
60 second imaging device

The invention claimed is:

1. A remote operation system having respective mutual communication functions of communicating with a work machine and a remote operation apparatus, the work machine including a lower traveling body and an upper revolving body, the upper revolving body being revolvable with respect to the lower traveling body, the remote operation apparatus being for remotely operating the work machine, the remote operation system comprising a support processing element configured to transmit, to the remote operation apparatus, a combined image in which an index image is superimposed at least partially on the work machine or a region around the work machine in a captured image obtained through an imaging device disposed around the work machine, the index image being generated based on a mode of appearance of the lower traveling body in the captured image and a mode of appearance of a designated component in the captured image, the designated component being unevenly disposed in a front or back direction of the lower traveling body, the index image indicating at least one of the front and back directions of the lower traveling body, wherein the support processing element superimposes the index image at least partially on the work machine or the region around the work machine in the captured image at an angle corresponding to a revolution angle of the upper revolving body with respect to the lower traveling body based on the mode of the appearance of the lower traveling body and the mode of the appearance of the designated component which change in accordance with a revolution of the upper revolving body with respect to the lower traveling body.

2. The remote operation system according to claim 1, wherein a plurality of the imaging devices is disposed at positions whose directions are different from each other as viewed from the work machine, and when the designated component of the lower traveling body does not appear in the one captured image obtained through the one imaging device, the support processing element superimposes an index image on the captured image, the index image being generated based on a mode of appearance of the lower traveling body and a mode of appearance of the designated component in another captured image obtained through another imaging device, the index image indicating the front or back direction of the lower traveling body.

3. The remote operation system according to claim 2, wherein the support processing element recognizes the revolution angle of the upper revolving body with respect to the lower traveling body based on a number of the designated components appearing in the one captured image and a number of the designated components appearing in the other captured image.

4. The remote operation system according to claim 1, wherein the support processing element recognizes the revolution angle of the upper revolving body with respect to the lower traveling body, the revolution angle being based on a position of the designated component in a left or right direction in the one captured image, the position serving as the mode of the appearance of the designated component included in the one captured image.

5. The remote operation system according to claim 1, wherein the support processing element obtains the captured image including the designated component having a three-dimensional shape, the designated component being formed by protruding from the lower traveling body.

6. The remote operation system according to claim 1, wherein the support processing element transmits, to the remote operation apparatus, the combined image in which the index image is superimposed on the one captured image based on image coordinates of the other captured image, a position at which the one imaging device is disposed, and an imaging area of the one captured image.

7. The remote operation system according to claim 1, wherein the lower traveling body of the work machine includes a pair of left and right crawlers, and the support processing element generates the index image in accordance with sizes of the crawlers in the combined image and positions of the crawlers in the combined image.

8. The remote operation system according to claim 1, wherein the support processing element obtains operation acceptance information that is information indicating whether or not an operation on the work machine is acceptable to the remote operation apparatus and transmits the combined image to the remote operation apparatus when the operation acceptance information indicates that the operation on the work machine is acceptable.

9. The remote operation system according to claim 1, wherein the support processing element obtains traveling operation information for a preparation action that is an action representing an intention of an operation input for moving forward or moving backward the work machine in the remote operation apparatus, transmits, to the remote operation apparatus, the combined image generated by using the index image indicating a forward direction of the lower traveling body when the intention represented by the preparation action is the operation input for moving forward, and transmits, to the remote operation apparatus, the combined image generated by using the index image indicating a backward direction of the lower traveling body when the intention represented by the preparation action is the operation input for moving backward.

10. The remote operation system according to claim 1, wherein a plurality of the work machines is disposed close to each other, and any one of the support processing element obtains positional information related to a position of the work machine that is a candidate for an operation target in a real space and recognizes the work machine that is the candidate for the operation target as the work machine that is the operation target when the position of the work machine calculated from the captured image matches the positional information related to the position of the work machine that is the candidate for the operation target in the real space.

11. A remote operation composite system comprising: the remote operation system according to claim 1; and at least one of the remote operation apparatus and the work machine.

* * * * *